(12) United States Patent
Vera-Castañeda

(10) Patent No.: US 9,162,890 B2
(45) Date of Patent: Oct. 20, 2015

(54) RECOVERY OF SULFUR TRIOXIDE HEAT OF ABSORPTION

(71) Applicant: MECS, Inc., Chesterfield, MO (US)

(72) Inventor: Ernesto Vera-Castañeda, Chesterfield, MO (US)

(73) Assignee: MECS, Inc., Chesterfield, MO (US)

( * ) Notice: Subject to any disclaimer, the term of this patent is extended or adjusted under 35 U.S.C. 154(b) by 0 days.

(21) Appl. No.: 14/216,084

(22) Filed: Mar. 17, 2014

(65) Prior Publication Data

US 2014/0322125 A1 Oct. 30, 2014

Related U.S. Application Data

(60) Provisional application No. 61/794,855, filed on Mar. 15, 2013.

(51) Int. Cl.
*C01B 17/74* (2006.01)
*C01B 17/765* (2006.01)
*C01B 17/80* (2006.01)

(52) U.S. Cl.
CPC ............... *C01B 17/74* (2013.01); *C01B 17/765* (2013.01); *C01B 17/806* (2013.01)

(58) Field of Classification Search
CPC ........................................................ C01B 17/74
USPC .......... 423/522, 529, 532, 533, 543; 122/7 R; 165/138
See application file for complete search history.

(56) References Cited

U.S. PATENT DOCUMENTS

| 3,147,074 A | 9/1964 | Maurer |
| 3,475,120 A | 10/1969 | Maurer et al. |
| 3,536,446 A | 10/1970 | Maurer |
| 4,478,809 A | 10/1984 | McAlister et al. |
| 4,576,813 A | 3/1986 | McAlister et al. |

(Continued)

FOREIGN PATENT DOCUMENTS

| JP | 59-116106 A | * 7/1984 | ............ 423/522 |
| WO | 2011139390 A2 | 11/2011 | |

OTHER PUBLICATIONS

Zhou, S., et al., Steam Turbine Operating Conditions, Chemistry and Condensates, and Environment Assisted Cracking—A Critical Review, 2002, NPL Report MATC(a) 95, 78 pages.

(Continued)

*Primary Examiner* — Timothy Vanoy
(74) *Attorney, Agent, or Firm* — Senniger Powers LLP

(57) ABSTRACT

A contact process for manufacture of sulfuric acid in which the vapor phase heat of formation of sulfuric acid in the sulfur trioxide conversion gas and the heat of absorption of $SO_3$ in sulfuric acid is recovered by transfer of heat from the absorption acid to high pressure boiler feed water that is fed to a waste heat boiler where steam is generated at a pressure of at least 40 bar by transfer of heat from sulfur dioxide combustion gas.

65 Claims, 8 Drawing Sheets

(56) References Cited

U.S. PATENT DOCUMENTS

| | | |
|---|---|---|
| 4,670,242 A | 6/1987 | McAlister et al. |
| 4,929,088 A | 5/1990 | Smith |
| 4,996,038 A | 2/1991 | McAlister et al. |
| 5,118,490 A | 6/1992 | McAlister |
| 5,130,112 A | 7/1992 | McAlister et al. |
| 5,538,707 A | 7/1996 | McAlister |
| 5,593,652 A | 1/1997 | Peng |
| 6,279,514 B1 | 8/2001 | Browder et al. |
| 8,586,001 B2 | 11/2013 | Vera-Castaneda |
| 2008/0226540 A1 | 9/2008 | Felthouse et al. |
| 2012/0107209 A1 | 5/2012 | Vera-Castaneda |

OTHER PUBLICATIONS

International Search Report, PCT/US2014/029220, dated Jul. 31, 2014, 5 pages.

Written Opinion, PCT/US2014/029220, dated Jul. 31, 2014, 10 pages.

* cited by examiner

US 9,162,890 B2

RECOVERY OF SULFUR TRIOXIDE HEAT OF ABSORPTION

REFERENCE TO RELATED APPLICATIONS

This application claims the benefit of U.S. Provisional Application Ser. No. 61/794,855, filed Mar. 15, 2013, the entire disclosure of which is incorporated herein by reference.

FIELD OF THE INVENTION

This invention relates to recovery of the heat of absorption of sulfur trioxide in sulfuric acid, and more particularly to a process in which a high fraction of the heat of absorption is recovered by transfer of heat to boiler feed water that is thereafter converted to high pressure steam.

BACKGROUND OF THE INVENTION

The contact process for manufacturing sulfuric acid is highly exothermic in several of its operations. Large amounts of reaction heat are generated in the combustion of a sulfur source, e.g., elemental sulfur, hydrogen sulfide, or a metal sulfide with an excess of oxygen to produce a gas containing sulfur dioxide and oxygen. Further substantial amounts of energy are generated in the catalytic conversion of sulfur dioxide to sulfur trioxide and in the absorption of sulfur trioxide into an aqueous absorption liquid comprising sulfuric acid to afford net production of sulfuric acid.

In the manufacture of sulfuric acid, it has long been conventional to recover the heat of combustion of the sulfur source by passing the combustion gas through a waste heat boiler. Because the combustion gas temperature is typically very high, high pressure steam, e.g., at 40 to 70 bar is generated in the waste heat boiler.

It has also been conventional to recover the heat of oxidation of sulfur dioxide to sulfur trioxide. Typically, combustion gas exiting the waste heat boiler is passed through a converter that comprises several successive conversion stages in each of which the gas stream comprising sulfur dioxide and oxygen is passed over a catalyst for the conversion reaction. For recovery of the heat of oxidation of sulfur dioxide to sulfur trioxide, conversion gas exiting the catalytic converter is typically passed through another waste heat boiler, a steam superheater and/or an economizer for heating boiler feed water for the waste heat boiler. Commonly, the conversion gas exiting the penultimate stage of a multi-stage converter is directed to an interpass absorption tower in which $SO_3$ contained in the gas is absorbed into sulfuric acid, thereby enhancing the driving force for conversion of $SO_2$ to $SO_3$ in the converter stage to which the gas stream is returned from the interpass absorber. The gas must be cooled before entering the interpass absorber, which may be accomplished in an economizer as noted above, and/or by passage through gas to gas heat exchangers wherein a stream returning from the interpass absorber is reheated by transfer of heat from a gas stream exiting the same or another converter stage. The returning gas is reheated to a temperature at which further conversion can occur in the converter stage to which the gas is returned.

In addition to the heat generated by combustion of sulfur and oxidation of sulfur dioxide to sulfur trioxide, a substantial increment of energy is generated by absorption of sulfur trioxide from the conversion gas into a sulfuric acid stream for production of sulfuric acid from $SO_3$. Until the 1980s, this increment of heat, which represents in the neighborhood of 25% of the total heat generated in the contact sulfuric acid process, was wasted to the atmosphere or used only in low level applications such as district heating. Absorption acid coolers constructed of stainless steel were typically operated at a maximum inlet temperature in the neighborhood of 110° C., more typically about 80° C.

U.S. Pat. Nos. 4,576,813 and 4,670,242 describe processes in which an $SO_3$ absorber and absorption acid cooler could be operated to heat a cooling fluid to a temperature of 120° C. or higher by maintaining the strength of the sulfuric acid stream exiting the absorber at a concentration of 98.5% or higher, preferably 99% or higher, and recovering the heat of absorption in a heat exchanger in which the heat transfer surfaces wetted by the acid were constructed of properly selected Fe/Cr alloys.

In the processes described in U.S. Pat. Nos. 4,576,813 and 4,670,242, sulfur is burned in dry air to produce a dry $SO_2$-bearing gas stream containing excess oxygen, and the $SO_2$ stream is passed through a converter to produce a dry $SO_3$-bearing gas stream that is directed to an absorption tower where it is contacted with sulfuric acid for high temperature absorption of the $SO_3$. Absorption acid from the high temperature tower, commonly referred to as a "heat recovery tower," is circulated through an external shell and tube heat exchanger comprising tubes constructed of an appropriate Fe/Cr alloy. In the heat exchanger, heat is transferred to a heat transfer fluid and recovered in useful form. In commercial implementation of the processes described in U.S. Pat. Nos. 4,576,813 and 4,670,242, heat transferred from the absorption acid generates medium pressure steam that is useful in power generation and/or in co-ordinate process operations.

Typically, the high temperature absorber functions as an interpass tower from which the $SO_3$-depleted $SO_2$ stream is returned to a further converter stage to produce a further $SO_3$ conversion gas stream that is then directed to a final absorption tower. To maximize $SO_3$ recovery and minimize sulfuric acid mist, the final absorption tower is ordinarily operated at relatively modest temperature, for example, about 80° C.

U.S. Pat. No. 5,118,490 describes the recovery of $SO_3$ absorption heat from "wet gas." The reference discloses options for heating boiler feed water by transfer of heat from heat recovery absorption system (HRS) acid. Boiler feed water for the heat recovery system boiler 15 can be preheated in heat exchanger 19 by HRS acid exiting intermediate pressure boiler 15. Boiler feed water for the sulfur dioxide combustion gas waste heat boiler can be heated with high temperature HRS acid by dividing the acid stream exiting the high temperature absorber between HRS boiler 15 and another heat exchanger 21 for preheating high pressure boiler feed water. The HRS acid preferably leaves the absorber at a temperature greater than 200° C. (392° F.), and steam is preferably generated at ≥450 kPa in HRS boiler 15. In other embodiments, the '490 patent discloses that heat exchangers 15 and 21 can be operated in series, in which case the acid typically flows first through exchanger 21.

U.S. Pat. No. 5,130,112 describes a process in which the energy recovered from the $SO_3$ absorption operation is enhanced by injection of steam into the $SO_3$ conversion gas stream prior to absorption. After steam injection, the conversion gas is preferably passed through an economizer, more preferably a condensing economizer, prior to entry into the absorber. The bulk of the HRS acid exiting HRS boiler 107 is recycled as absorption acid for HRS absorption zone 133, but a fraction 137 is transferred to final absorber 157 as makeup to compensate for product acid withdrawn from the final absorption circuit. The latter fraction passes in series through heat exchangers 139 and 141, in each of which the forward flow acid fraction is further cooled by transfer of heat to boiler feed water. In heat exchanger 141, boiler feed water for both the HRS boiler and the $SO_2$ combustion gas waste heat boiler is preheated to 131° C. (268° F.). Boiler feed water exiting exchanger 141 passes through de-aerator 165 and then is divided between the HRS boiler and the waste heat boiler. The fraction flowing to the HRS boiler passes through heat exchanger 139 where it is heated to 184° C. (363° F.) by transfer of heat from the forward flow HRS acid fraction. The other fraction (at 138° C.; 280° F.) flows through heat exchanger 155 where it is heated by transfer of heat from final stage conversion gas and then through condensing economizer 131 where it is further heated by transfer of heat from third stage conversion gas.

U.S. Pat. No. 4,996,038 describes a process in which dilution water can be added as a vapor to the circulating acid, optionally within the tower. Both U.S. Pat. No. 4,996,038 and U.S. Pat. No. 5,538,707 describe heat recovery in an absorption tower comprising a primary absorption zone into which the $SO_3$ gas stream is initially introduced and a secondary absorption zone, above the primary zone, in which the gas stream is cooled and residual $SO_3$ recovered. Boiler feed water is preheated at relatively low temperatures by transfer of heat from acid circulating through the final absorption tower of an interpass process, and by transfer of heat from acid circulating through the drying tower.

PCT Application WO 2011/139390 describes sulfuric acid manufacturing processes wherein increased fractions of water vapor are introduced into the $SO_3$ conversion gas entering a high temperature absorber, thereby increasing the molar ratio of water vapor to sulfur trioxide to 0.40 or higher. Introduction of water vapor increases the quantity of intermediate pressure steam that may be generated per ton of sulfuric acid produced by transfer of heat from the absorption acid exiting the heat recovery system boiler. This application also discusses the option of extracting further energy from absorption acid exiting the heat recovery system boiler by directing it to one or more auxiliary heat exchanger(s) for heating and/or de-aerating boiler feed water. The boiler feed water is heated to a temperature typically in the range of 180° C. (356° F.), but the major fraction of the absorption heat is extracted in the heat recovery system boiler, thus, limiting the extent to which boiler feed water can be heated by transfer of heat from the absorption acid downstream of the boiler.

SUMMARY OF THE INVENTION

Among the objects of certain and various preferred embodiments of the invention are to recover a high fraction of the heat of absorption of sulfur trioxide in sulfuric acid at relatively high temperature, and, more particularly, to recover a high fraction of the heat of absorption in the form of high pressure steam; and to recover the heat of absorption at high temperature in a contact sulfuric acid manufacturing facility comprising only a single absorption system.

Disclosed herein is a process for the manufacture of sulfuric acid in which a source gas comprising sulfur trioxide is contacted in a primary heat recovery absorption zone with a sulfur trioxide absorption acid stream comprising liquid sulfuric acid, thereby transferring sulfur trioxide from the source gas to the absorption acid stream and heating the absorption acid stream by heat of absorption. Heat is transferred from the absorption acid stream to a boiler feed water stream in an array of heat exchangers that are in series with respect to the flow of both the boiler feed water stream and the absorption acid stream, and with respect to which array the absorption acid stream and the boiler feed water stream flow countercurrently. The boiler feed water stream is allowed to flash in a reduced pressure zone in the boiler feed water flow path between two successive heat exchangers in the series, thereby generating steam and cooling the boiler feed water stream in the reduced pressure zone. Steam generated in the reduced pressure zone is separated from the cooled boiler feed water stream, and energy is recovered in useful form from steam generated in the reduced pressure zone. The cooled boiler feed water stream is pressurized and transferred to another heat exchanger in the series that is downstream of the reduced pressure zone with respect to the flow of boiler feed water. Pressurized boiler feed water is heated in the another heat exchanger by transfer of heat from the absorption acid. Steam is generated from the pressurized liquid water stream at a pressure of at least 40 bar in a boiler that is outside of the aforesaid array of heat exchangers and downstream of the another heat exchanger with respect to the flow of boiler feed water; and the absorption acid stream is circulated from the series of heat exchangers back to the heat recovery absorption zone.

Further disclosed herein is a process for the manufacture of sulfuric acid in which a source gas comprising sulfur dioxide is contacted in a primary heat recovery absorption zone with a sulfur trioxide absorption acid stream comprising liquid sulfuric acid, thereby transferring sulfur trioxide from the source gas to the absorption acid stream and heating the absorption acid stream by heat of absorption. Heat is transferred from the absorption acid stream to a boiler feed water stream; and thereafter steam is generated from the heated boiler feed water stream at a pressure of at least 40 bar. At least about 60%, 75%, 85%, 90%, 95%, or 97% of the heat of absorption generated in the heat recovery absorption zone is recovered in the form of steam having a pressure of at least 40 bar that is generated in the boiler.

Also disclosed is a process for the manufacture of sulfuric acid in which a source gas comprising sulfur trioxide is contacted in a primary heat recovery absorption zone with a sulfur trioxide absorption acid stream comprising liquid sulfuric acid, thereby transferring sulfur trioxide from the source gas to the absorption acid stream and heating the absorption acid stream by heat of absorption. At least 60%, 75%, 85%, 90%, 95%, or 97% of the heat of absorption generated in the heat recovery absorption zone is transferred to a boiler feed water stream; and the boiler feed water is pressurized to at least 40 bar.

Still further disclosed is a process for the manufacture of sulfuric acid in which a source gas comprising sulfur trioxide is contacted in a primary heat recovery absorption zone with a sulfur trioxide absorption acid stream comprising liquid sulfuric acid, thereby transferring sulfur trioxide from the source gas to the absorption acid stream and heating the absorption acid stream by heat of absorption. Heat is transferred from the absorption liquor to a boiler feed water stream, thereby heating said boiler feed water stream to a temperature of at least 400° F.

The instant disclosure is further directed to a process for the manufacture of sulfuric acid wherein sulfur is burned in a gas containing excess oxygen to produce a combustion gas comprising sulfur dioxide and oxygen. The combustion gas is passed through a waste heat boiler wherein the heat of combustion is recovered by transfer of heat to a boiler feed water stream for generation of steam at a pressure greater than 40 bar. The combustion gas is contacted with a catalyst in a series of catalytic conversion zones for conversion of sulfur dioxide to sulfur trioxide, thereby producing a conversion gas comprising sulfur trioxide. The conversion gas is contacted with a sulfur trioxide absorption acid stream comprising liquid sulfuric acid in a heat recovery absorption zone, thereby transferring sulfur trioxide from the source gas to the absorption acid stream and heating the absorption acid stream by heat of absorption. Heat is transferred from the absorption acid stream to a boiler feed water stream. Thereafter, the boiler feed water stream is transferred to the waste heat boiler for generation of steam from the heated boiler feed water stream at a pressure of at least 40 bar. At least about 60%, 75%, 85%, 90%, 95%, or 97% of the heat of absorption generated in the heat recovery absorption zone is recovered in the form of steam having a pressure of at least 40 bar that is generated in said boiler. Residual sulfur dioxide contained in the gas stream exiting the heat recovery absorption zone is discharged from the process without further contact with catalyst for the conversion of sulfur dioxide to sulfur trioxide.

Other objects and features will be in part apparent and in part described hereinafter.

DESCRIPTION OF THE PREFERRED EMBODIMENTS

Figure 1:
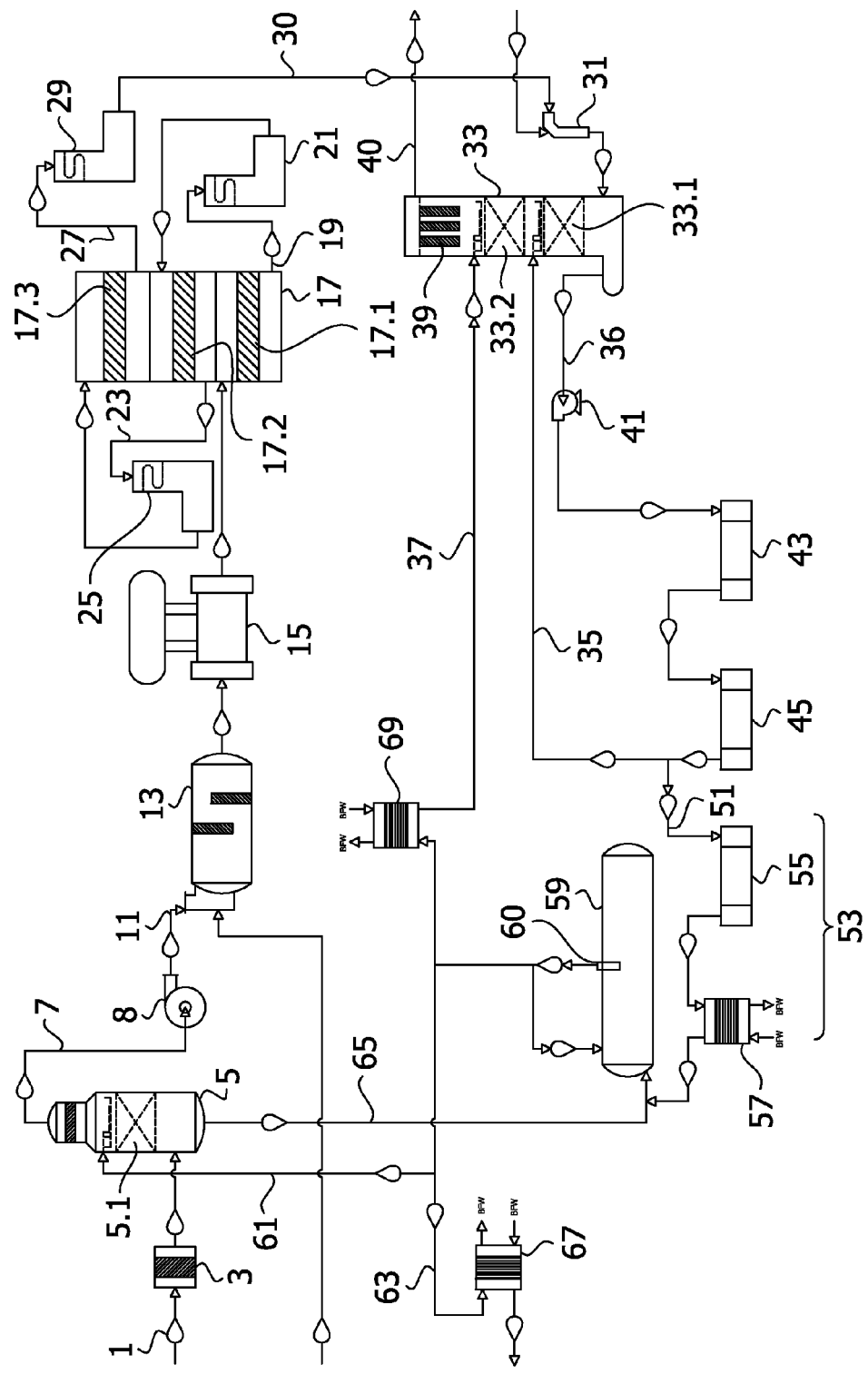
FIG. 1 is a process side schematic flow sheet of a contact sulfuric acid process implementing a preferred embodiment of the invention wherein substantially all $SO_3$ absorption heat is recovered in the form of high pressure steam, the flow sheet showing circulation of absorption acid between a heat recovery system (HRS) absorber, combustion air drying tower, and an array of heat exchangers for transfer of absorption heat to boiler feed water for the sulfur dioxide combustion gas waste heat boiler.

In accordance with the invention, processes are provided by which a high fraction of the heat of absorption of sulfur trioxide in sulfuric acid is recovered at high temperature, preferably in the form of high pressure steam, e.g., at 40 to 70 bar.

Preferably, the process comprises the manufacturing of sulfuric acid in a contact sulfuric acid plant. Although prior art sulfuric acid processes have recovered some fraction or residue of $SO_3$ absorption energy in the form of high pressure steam, the focus of the art has been on recovery of the absorption heat by generation of intermediate pressure steam in an HRS boiler.

In preferred embodiments of the processes of the present invention, a major share of the absorption heat is recovered at significantly higher temperatures than is possible from the generation of steam in an HRS boiler. Because the maximum absorption acid temperature achieved in a high temperature $SO_3$ absorber is typically in the range of 450° to 500° F., the maximum steam pressure achieved in an HRS boiler is typically in the range of 9-15 bar. The temperature of the absorption acid, and thus the pressure of steam generated in an HRS boiler, are limited by the heat of absorption, and in the case of steam injection, the sum of the heat of absorption, heat of vapor phase formation of sulfuric acid, and heat of condensation relative to the flow of acid, the absorption efficiency, and potentially by the strength, corrosion resistance and cost HRS of boiler tubes.

In contrast, the temperatures reached in combustion of sulfur typically range in excess of 2000° F., and steam having a pressure in the 40 to 70 bar range is readily generated by passing the combustion gas through a waste heat boiler. By transfer of heat from the HRS acid to boiler feed water for this or another high pressure boiler, the heat of absorption, heat of vapor phase formation of sulfuric acid, and heat of condensation may be recovered in the form of high pressure steam. Although the boiler feed water cannot ordinarily be heated to a temperature much above 400° F.-440° F. by transfer of heat from absorption acid, the heat thus transferred is nonetheless recovered in the form of the high pressure steam, typically at 40 to 70 bar, that is generated in the boiler to which the heated boiler feed water is ultimately delivered. As a result of the increase in boiler feed water temperature provided by transfer of heat from the absorption acid, the sensible heat load on the waste heat boiler is reduced, the quantity of steam generated over a given high pressure boiler heat transfer surface is increased, and/or the pressure at which steam is generated on an industrial scale at a given boiler water feed rate can be increased. As a consequence, the energy of absorption, and in the case of steam injection, the heat of vapor phase formation of sulfuric acid and heat of condensation, may be recovered in useful form at a pressure far in excess of the pressure than can be achieved using HRS acid directly for the generation of intermediate pressure steam.

In accordance with invention, the heat of $SO_3$ absorption is preferably used to preheat boiler feed water to a temperature of at least about 400° F., the heated boiler feed water is typically further heated by transfer of heat from one or more $SO_3$ conversion gas streams, and the heated feed water is ultimately introduced into a high pressure boiler where steam is preferably generated at a pressure of at least about 40 bar. More preferably, transfer of heat from the HRS acid heats the boiler feed water to a temperature of at least about 375° F., 390° F., 400° F., 410° F., 420° F. or 425° F. 400.

Optionally, the boiler feed water can be divided between a high pressure boiler such as the waste heat boiler for $SO_2$ combustion gas, and a conventional HRS boiler where steam is generated at a pressure up to about 10 bar. Advantageously, all the boiler feed water is transferred to the high pressure boiler. In any case, preferably at least 60%, 75% or 85% of the heat of absorption is recovered in the form of steam having a pressure of at least about 40 bar. More preferably, at least about 90%, at least about 95% or at least about 97% of the heat of absorption is recovered in the form of steam having a pressure of at least about 40 bar. Even more preferably, at least 60%, 75%, 85%, 90%, 95% or 97% of the heat of absorption is recovered in the form of steam having a pressure≥50 bar, e.g., between 50 and 70 bar.

In a wet gas sulfuric acid plant, or any plant in which water vapor is injected into the $SO_3$ conversion gas upstream of the heat recovery absorption zone, the quantity of energy recovered in the absorption acid is increased by the heat of vapor phase formation of sulfuric acid, and the heat of condensation of water and sulfuric acid from the gas phase into the acid phase in the heat recovery absorption zone. In such operations, the process of the invention is capable of recovering at least about 60%, 75% or 85%, more preferably at least about 90% or at least about 95% of the sum of the vapor phase heat of formation of sulfuric acid, $SO_3$ absorption energy and the heat of condensation in the form of ≥40 bar steam or ≥50 bar steam. An even higher percentage, e.g., greater than 97% or greater than 99% of this energy can be recovered in the combination of ≥40 or ≥50 bar steam plus a component of low pressure steam applied to a useful purpose such as providing the source of steam for injection into conversion gas in or upstream of the heat recovery absorption zone as described hereinbelow.

One impediment to the maximum recovery of absorption energy, or absorption plus condensation energy, in the form of ≥40 bar steam, is a potentially inadequate temperature differential (Δt) between the HRS acid and the high pressure boiler feed water. Because the maximum temperature to which the absorption acid can be raised in the heat recovery absorption zone is generally not greater than about 500° F., more typically not more than about 450° F., it is not possible to heat the boiler feed water to a temperature higher than about 420° F. or 430° F. by transfer of heat from the absorption acid.

Thus, the extent to which the absorption heat can be recovered by transfer to boiler feed water may be limited by the volumetric boiler water flow demand of the waste heat boiler relative to the maximum temperature to which the absorption acid may be raised in the heat recovery absorption zone. Whereas the rate of generation of absorption energy, or absorption plus sulfuric acid condensation energy, may theoretically be sufficient to heat the requisite volume of boiler feed water to a relatively high temperature, considerations of absorption efficiency, requisite acid flows, materials of construction, etc., may preclude heating the absorption acid itself to a temperature high enough to provide a satisfactory Δt for transfer of heat to boiler feed water at the temperatures otherwise theoretically attainable. This problem is especially acute in the preferred embodiments of the invention wherein energy generation in the $SO_3$ absorption system is enhanced by providing dilution water ($SO_3$ reaction water) in the form of water vapor. For example, in the process illustrated in FIG. 1 wherein nearly 100% of the dilution water is supplied in the form of injected steam or injected steam plus humidity from the inlet combustion air (as condensed in a drying tower integrated into the absorption acid circuit), the rate of heat generation in the sulfur burner is roughly twice the rate of heat generation in the HRS absorber. Based on this relationship, if all the absorption heat is directed to increasing the sensible heat of boiler feed water for the waste heat boiler, the theoretical temperature rise in the feed water is in the neighborhood of 395 Fahrenheit degrees. Typically, the boiler feed water is available at 70° to 100° F. Assuming 85° F., this means that, if all the HRS heat (absorption+condensation) were to be transferred to increase the sensible heat content of the feed water for the waste heat boiler, the boiler feed water temperature would need to rise to 480° F., which would require either a negative Δt near the boiler feed water exit of the heat exchanger(s) in which the heat transfer is effected, or at best a very small positive Δt that would equate to an uneconomically large heat transfer surface area.

Even in the face of these constraints, a very high proportion of the absorption heat, or the heat of absorption plus vapor phase sulfuric acid formation plus condensation, can be recovered in the high pressure boiler feed water if heating of boiler feed water is given precedence over generation of intermediate pressure steam in the heat recovery scheme, as is preferred in accordance with the processes of the current invention.

However, in a further preferred embodiment of the invention, essentially all the heat of absorption and condensation can be recovered in a uniquely designed heat transfer scheme wherein heat is transferred from the absorption acid stream to a boiler feed water stream in an array of heat exchangers that are in series with respect to the flow of both the boiler feed water stream and the acid stream, and with respect to which the acid stream and the boiler feed water stream flow countercurrently. By itself, this series of heat exchangers can maintain a positive Δt substantially throughout the course of heat transfer, but does not necessarily assure transfer of 85%, 90%, 95%, or 97% of the absorption heat, or especially of the absorption+condensation heat, or assure such quantitative transfer over a commercially viable heat transfer surface area.

In a still further preferred embodiment of the invention, it has been discovered that an adequate Δt for recovery of absorption energy in form of high pressure steam can be achieved by allowing the boiler feed water stream to flash in a reduced pressure zone, typically a flash tank or de-aerator, preferably substantially adiabatic, in the boiler feed water flow path between two successive heat exchangers in a heat exchanger series. Flashing the boiler feed water generates a modest fraction of steam that may be applied to a useful purpose, and cools the boiler feed water stream in flash tank or other reduced pressure zone. By proper selection of the pressure maintained in the de-aerator, flash tank or other lower pressure zone, the boiler feed water stream can be cooled to a level that preserves a positive and economically viable Δt through the remainder of the array of exchangers in which absorption or (absorption+condensation) heat is transferred from the HRS absorption acid to the boiler feed water at high levels of heat recovery approaching 100%.

The steam flashed in the reduced pressure zone is separated from the cooled boiler feed water stream and the latter is pressurized to be further heated prior to introduction into the high pressure boiler, typically and preferably the waste heat boiler in which steam is generated by transfer of heat from the $SO_2$ combustion gas of a contact sulfuric acid facility.

It will be understood that, in these embodiments, the preference that the boiler feed water and absorption acid flow countercurrently relates to the array of heat exchangers, i.e., it is preferred that there is countercurrent flow with respect to a series of heat exchangers comprised by the array. Countercurrent flow may also desirable within each of the heat exchangers but this is a secondary consideration. In typical multi-pass shell and tube heat exchangers, flow patterns are complex and often not readily classified as either countercurrent or co-current.

The conversion gas is typically produced in a converter that comprises a plurality of catalytic conversion stages in series. In particularly preferred embodiments of the invention, only the final stage converter gas is directed to an absorber. In such embodiment, there is only one absorption gas stream, and the gas exiting the heat recovery absorption zone is not directed to any further catalytic conversion zone for further conversion to sulfur trioxide of residual sulfur dioxide contained in the gas exiting the heat recovery absorption zone. Instead, this stream becomes the $SO_2$-bearing tail gas that is directly or ultimately removed from the sulfuric acid manufacturing process.

Generally, the conversion gas stream directed to the heat recovery absorption zone contains at least 3 volume percent, more typically, at least 4 volume percent, more typically between about 5 and about 12 volume percent, sulfur trioxide. Under the high temperature conditions of the heat recovery absorption zone, some residual sulfur dioxide remains in the gas exiting the heat recovery zone, and the gas is essentially saturated with sulfuric acid vapor. Thus, regardless of whether only the final converter stage gas is subjected to absorption, or whether the process comprises a single absorption system or both interpass and final absorbers, gas exiting the heat recovery absorption zone is preferably passed through a secondary absorption zone where the gas is contacted with a secondary absorption acid stream for cooling the gas stream, condensing sulfuric acid vapor, and recovering residual sulfur trioxide by absorption. Proper operation of the secondary absorption zone makes a further contribution in suppressing acid mist formation in the tail gas from the process.

Tail gas from a sulfuric acid manufacturing process unavoidably contains some residual unreacted sulfur dioxide, permissible emissions of which are generally limited by regulatory specifications. Where only a single absorption system is used, whether that system comprises only the heat recovery absorption zone or both a heat recovery absorption zone and secondary absorption zone in series, the tail gas from the process may contain a slightly higher sulfur dioxide content than the tail gas of an interpass process where the equilibrium oxidation reaction is driven further toward conclusion by removal of sulfur trioxide by absorption in sulfuric acid before the gas enters the final converter stage. However, regardless of whether the process comprises an interpass absorber or only a single absorption system, it can be difficult to control the sulfur dioxide content of the tail gas within increasingly restrictive regulatory constraints. Moreover, even if emissions standards are met, the presence of sulfur dioxide in the tail gas represents a sacrifice in yield on sulfur.

Thus, in various preferred embodiments of the invention, the tail gas contaminated with unreacted sulfur dioxide is directed to a process for recovery of sulfur dioxide in an $SO_2$ absorption and stripping circuit. Further in accordance with the invention, the sulfur dioxide recovery system can be integrated with a contact sulfuric acid manufacturing facility in which a high fraction of sulfur trioxide absorption energy is recovered at high temperature, and more particularly in the form of high pressure steam. For example, heat can be transferred from absorption acid to provide a source of heat for stripping $SO_2$ from an $SO_2$ absorption liquor and heat can be transferred from the resulting regenerated sulfur dioxide absorption medium to the boiler feed water. But in order to maximize the recovery of energy in the form of high pressure steam, or otherwise at high temperature, it may be preferable to forego transfer of heat from absorption acid to an $SO_2$ recovery system, but advantageous to import energy from the $SO_2$ recovery system by transfer of heat to boiler feed water, e.g., by cooling regenerated absorption medium exiting an $SO_2$ stripping column. The heat exchangers for such duty can be integrated into an array of heat exchangers in which heat is transferred from absorption acid to boiler feed water for a high pressure boiler such as the waste heat boiler for the recovery of energy from sulfur dioxide combustion gas. However, for definitional purposes herein, it should be noted that heat exchangers for transfer of heat from an $SO_2$ recovery process stream to boiler feed water are not deemed members of an array of heat exchangers for transfer of heat from HRS acid to boiler feed water, as the term "array" is used herein, even if the heat exchanger(s) for transfer of heat from an $SO_2$ process stream are fully integrated into a series of heat exchangers for transferring heat from HRS acid to boiler feed water.

Illustrated in FIG. 1 is a preferred process of the invention for recovery of the heat of absorption and heat of condensation in a high temperature $SO_3$ (HRS) absorption system in the form of high pressure steam.

Ambient air 1 flows through an inlet air filter 3 into an air inlet at the bottom of an air drying tower 5 where humidity is removed from the air by contact with concentrated sulfuric acid in a gas liquid contact zone 5.1 within the tower. In the process of FIG. 1, as further described herein below, the concentrated acid circulated through the drying tower comprises absorption acid from an HRS absorber, the acid having been cooled by transfer of absorption heat to boiler feed water in a series of heat exchangers arrayed so that the absorption acid and the boiler feed water pass countercurrently with respect to the series of exchangers.

Dry air 7 at a temperature of 150-170° F. exiting dry tower 5 is compressed by compressor 8 and directed to sulfur burner 13. Compression of the air heats it significantly, i.e., to a temperature of 250° to 350° F. Molten sulfur is sprayed into the sulfur burner wherein it is contacted with compressed air 11 flowing at a rate such that the oxygen component of the air is in stoichiometric excess relative to the sulfur flow entering the burner. Sulfur reacts with oxygen of the air to produce a combustion gas comprising sulfur dioxide, nitrogen and unreacted oxygen. The $SO_2$ combustion gas exits the sulfur burner at 2150 to 2250° F. and is thereafter cooled to a temperature of 700-820° F. by transfer of heat to boiler feed water in waste heat boiler 15.

Combustion gas exiting waste heat boiler 15 flows to converter 17, enters first converter stage 17.1, and is contacted therein with a catalyst for the oxidation of sulfur dioxide to sulfur trioxide by reaction with the oxygen component of the gas. The oxidation of sulfur dioxide to sulfur trioxide is also highly exothermic, so that the conversion gas 19 exiting first converter stage 17.1 is typically at a temperature of 1100° to 1150° F. The first stage converter gas 19 is passed through a superheater 21 where heat is transferred from the conversion gas to high pressure steam from the waste heat boiler as described hereinbelow, thereby cooling the conversion gas to about 775° to 825° F. In addition to recovery of the conversion heat, cooling the gas establishes a more favorable equilibrium for further conversion of $SO_2$ to $SO_3$ in second catalytic converter stage 17.2 to which the conversion gas flows from superheater 21.

Conversion gas 23 exiting second conversion stage 17.2 at a temperature of 925° to 975° F. flows to another superheater 25 where heat is transferred from gas stream 23 to high pressure steam from the waste heat boiler as also described below. Second stage conversion gas exiting superheater 25 at a temperature of typically 775° F. to 825° F. is directed to third and final catalytic converter stage 17.3 of converter 17 for further conversion of $SO_2$ to $SO_3$. Again, cooling the gas ahead of stage 17.3 provides a more favorable equilibrium therein for further conversion to $SO_3$. Third stage conversion gas 27 exits the converter at a temperature of typically 820° to 860° F. and is passed through an economizer 29 where heat is transferred from the conversion gas to boiler feed water for the waste heat boiler, as further described below. Conversion gas exiting economizer 29 is directed to the heat recovery absorption system. Passage of the conversion gas through the economizer reduces the gas temperature from the range between about 820° and about 860° F. by 350 to 420 Fahrenheit degrees, i.e., to a temperature in the range between about 430° and about 490° F.

Cooling the gas leaving the final conversion stage is preferred because satisfactory operation of the heat recovery absorption zone is difficult to achieve with excessively hot conversion gas entering the zone. If the gas enters at an excessively high temperature, poor absorption and vaporization of sulfuric acid may occur at the gas entry end of the absorption zone, followed by shock cooling and massive sulfuric mist formation toward the acid inlet end of the absorption zone. The energy transferred in the economizer 29 is recovered in the form of high pressure steam in waste heat boiler 15.

Final stage conversion gas 30 at 430° to 490° F. and 0.6 to 0.8 bar gauge is introduced into a steam injection vessel 31, where low pressure steam is introduced into the gas stream at stoichiometric ratio to the sulfur trioxide content thereof of most preferably about 0.80 to about 0.90. Injection of steam results in the vapor phase reaction of $SO_3$ and water to generate sulfuric acid vapor. In other embodiments, the conversion gas can remain dry, or only lesser fractions of water vapor can be injected into the gas. However, injection of water vapor significantly increases the amount of energy that can be recovered in the $SO_3$ absorption system, and, more particularly, the amount of energy that can ultimately be recovered in the form of high pressure steam, or otherwise at high temperature. In addition to the heat of reaction of $SO_3$ and water in forming sulfuric acid, injection of water vapor into the conversion gas provides for recovery of the heat of condensation of vapor phase sulfuric acid and the heat of condensation of unreacted water vapor. It is generally preferred that the water vapor is injected into the conversion gas upstream of the heat recovery absorption zone in a proportion sufficient to increase the equivalent water vapor content of the gas to at least about 0.40 moles per mole total equivalent sulfur trioxide gas content in the gas entering the heat recovery absorption zone. More preferably, water vapor is introduced in a proportion sufficient to increase the equivalent water vapor content of the gas stream to at least about 0.55 moles, still more preferably 0.60 moles, yet more preferably at least about 0.70 moles, and most preferably at least about 0.80 moles, per mole total equivalent sulfur trioxide content of the gas entering the heat recovery absorption zone.

As used herein, the "equivalent sulfur trioxide" is the sum the free sulfur trioxide content plus sulfuric acid produced by vapor phase reaction of sulfur trioxide and water; and "equivalent water vapor" is the sum of the free water vapor and sulfuric acid produced by vapor phase reaction of sulfur trioxide and water vapor.

In a typical material balance for the embodiment illustrated in FIG. 1, water vapor is injected to provide 85% of the reaction water for forming sulfuric acid from sulfur trioxide, and integration of the drying tower acid circuit with the absorption acid circuit provides all or substantially all the remaining reaction water by absorption of moisture from combustion air in drying tower 5. Thus, nearly 100% of the heat of condensation of the water of reaction is recovered, plus significant additional energy from the heat of condensation of sulfuric acid. In any event, in the process of FIG. 1, the injection of water vapor and resultant vapor phase formation of sulfuric acid by reaction of $SO_3$ and water vapor typically heats the conversion gas stream exiting injection vessel 31 to a temperature typically in the range of 570° to 650° F. This gas stream is introduced into a gas inlet near the bottom of heat recovery absorption tower 33 below heat recovery absorption zone 33.1. Heat recovery zone 33.1 preferably comprises means for promoting mass transfer between the gas phase and the liquid phase, such packing or trays. In the heat recovery absorption zone, the gas stream is contacted with absorption acid 35 which enters the heat recovery absorber, typically an absorption tower, at a temperature between about 370° F. and about 450° F. and a concentration of 99.0% to 99.4%. The absorption acid enters the top of the heat recovery zone and flows downwardly through zone countercurrently to the gas stream. Contact of absorption acid and gas in the heat recovery zone results in absorption of $SO_3$ into the liquid phase, condensation of sulfuric acid vapor from the gas phase into the liquid phase, and condensation of water vapor from the gas phase to the liquid phase. Sensible heat is also transferred from the gas phase to the liquid phase.

As illustrated in FIG. 1, the heat recovery tower 33 preferably also includes a secondary absorption zone 33.2 where gas exiting the primary (heat recovery) absorption zone is contacted with a secondary absorption acid stream 37 that is introduced into the top of secondary absorption zone 33.2 and flows downwardly therethrough countercurrently to the gas stream flowing upwardly. The secondary absorption zone also includes packing or other means for promoting mass transfer between the acid phase and the liquid phase. Secondary absorption acid 37 enters the secondary absorption zone at a temperature typically in the range of 120° to 160° F. Contact of the gas stream exiting the primary absorption zone with secondary absorption acid in the secondary absorption zone results in absorption of residual $SO_3$ from the gas exiting the primary zone and cools the gas stream, resulting in further condensation of sulfuric acid vapor into the secondary absorption acid. The secondary absorption acid exits the bottom of the secondary absorption zone and is preferably combined with absorption acid entering the heat recovery tower between the bottom of the secondary zone and the top of the primary zone to form a combined acid stream that functions as the primary absorption acid for the heat recovery absorption zone.

The gas stream exiting the top of the secondary absorption and cooling zone 33.2 passes through sulfuric acid mist eliminators 39 and exits as tail gas 40 from the process. Optionally, sulfur dioxide may be recovered from the tail gas in a sulfur dioxide recovery process comprising an absorption and stripping circuit that, in turn, may optionally be integrated with the $SO_3$ absorption heat recovery process described herein. Acid from the mist eliminators 39 may conveniently flow back down into the heat recovery absorption tower and mix with the secondary absorption acid.

From the vapor phase heat of formation of sulfuric acid, heat of absorption, heat of condensation, and sensible heat transfer, the enriched absorption acid 36 exiting the heat recovery absorption zone is heated to a temperature between about 450° F. and about 490° F. Hot absorption acid from the heat recovery absorption zone flows in series through an array of heat exchangers in which heat is transferred to boiler feed water for waste heat boiler 15. The boiler feed water generally also flows in series through the array of exchangers, with the absorption acid and boiler feed water flowing substantially countercurrently with respect to the series of exchangers.

On the acid side, the enriched absorption acid 36 exiting the heat recovery zone 33.1 into the well of heat recovery tower 33 flows to the suction side of an HRS acid circulating pump 41 from whence it is delivered first to an HRS economizer 43 where the acid is cooled from a temperature in the range of 450° to 490° F. to a temperature in the range of 400° to 440° F., typically by between about 20 and about 40 Fahrenheit degrees, by transfer of heat to hot boiler feed water, thereby heating the hot boiler feed water from approximately the ambient boiling point or somewhat above to temperature in the range of 420° to 460° F., typically by 150 to 210 Fahrenheit degrees.

Exiting the first heat exchanger (economizer) 43, the acid stream passes through a second HRS heat exchanger 45 where the acid is further cooled from a temperature in the range of about 400° and about 440° F. to a temperature between about 370° and about 410° F., typically by between 20 and about 40 Fahrenheit degrees, by transfer of heat to boiler feed water, and where the boiler feed water is heated in a temperature range close to its ambient boiling point.

Acid exiting second heat exchanger 45 is divided between a primary absorption acid recirculation stream 35 and a forward acid flow stream 51. The forward acid flow stream 51 is directed to a third heat transfer system 53 which may typically comprise a plurality of heat exchangers, though not all of these heat exchangers necessarily serve to transfer heat from absorption acid to boiler feed water, and any that do not are therefore outside the defined array of heat exchangers that are arranged in series for the latter purpose. As illustrated in FIG. 1, the third heat transfer system comprises boiler feed water preheaters 55 and 57, i.e., in this case each of these heat exchangers is a part of the defined array. Forward acid flow stream 51 passes first through exchanger 55 and then through exchanger 57 while boiler feed water passes first through exchanger 57 and then through exchanger 55. In preheater 55, the acid is cooled from a temperature of between 370° and about 410° F. to a temperature in the range between about 190° and about 240° F., typically by between 150 and 200 Fahrenheit degrees, thereby heating boiler feed water from a temperature between about 175° and about 215° F. to a temperature between about 220° and about 260° F. In heat exchanger 57, acid exiting feed water preheater 55 at a temperature in the range of 190° to 240° F. is cooled, typically by 60 to 80 Fahrenheit degrees, to a temperature in the range of 130° to 160° F., thereby heating boiler feed water by between about 30 and about 50 Fahrenheit degrees to a temperature in the range between about 120° and 160° F.

Downstream of third heat transfer system 53, the HRS acid stream is divided to provide a product acid stream, a secondary absorption acid stream for recirculation to secondary absorption zone 33.2, and a third stream for circulation to drying tower 5 for absorption of moisture from combustion air stream 1. Preferably, division of the HRS acid is preceded by delivery of the forward flow stream 51 to a common reservoir, i.e., common acid pump tank 59 as illustrated in FIG. 1 which also receives drying tower acid returned from drying tower 5. The resulting mixture, as drawn from common acid pump tank by common acid pump 60, is divided to yield secondary absorption acid stream 37 that is returned to the secondary absorption zone 33.2 of heat recovery absorber 33, a drying tower acid feed stream 61 that is directed to the drying tower and product acid stream 63 that is removed from the process.

Typically, the temperature of acid in common pump tank 59 is in the range of 140° to 180° F. Drying tower acid stream 61 at the temperature of the pump tank is typically heated by about three Fahrenheit degrees by the heat of absorption of water vapor from the combustion air in drying tower 5. Spent drying tower acid 65, diluted by absorption of water vapor from the combustion air, is returned to the pump tank in the embodiment illustrated in FIG. 1.

Product acid 63 is cooled from the pump tank temperature to a temperature in the range of 80° to 115° F., typically by about 40 to 70 Fahrenheit degrees, by transfer of heat to boiler feed water in a fourth heat transfer system comprising a product acid cooler 67, thereby heating the boiler feed water from a temperature typically at ambient or moderately elevated above ambient to a temperature 5 to 15 Fahrenheit degrees higher.

In the embodiment of FIG. 1, the secondary absorption acid returned from the pump tank to the secondary absorption zone is further cooled by transfer of heat to boiler feed water in a fifth heat transfer system comprising secondary absorption acid cooler 69. In such embodiment, the secondary absorption acid is typically cooled from by about 5 to 15 Fahrenheit degrees, e.g., from a temperature in the range of 155° to 165° F. to a temperature in the range of 120° to 160° F. In the implementation of such embodiment, the absorption acid flow is in parallel rather than in series with respect to the fourth and fifth heat transfer systems. But either one of heat exchangers 67 or 69 qualifies as part of an array of exchangers which are in series, each of which series further comprises exchangers 57, 55, 45 and 43. Flow of boiler feed water and absorption acid in each of these overlapping series is countercurrent with respect to the series of heat exchanger comprising the array.

Figure 2:
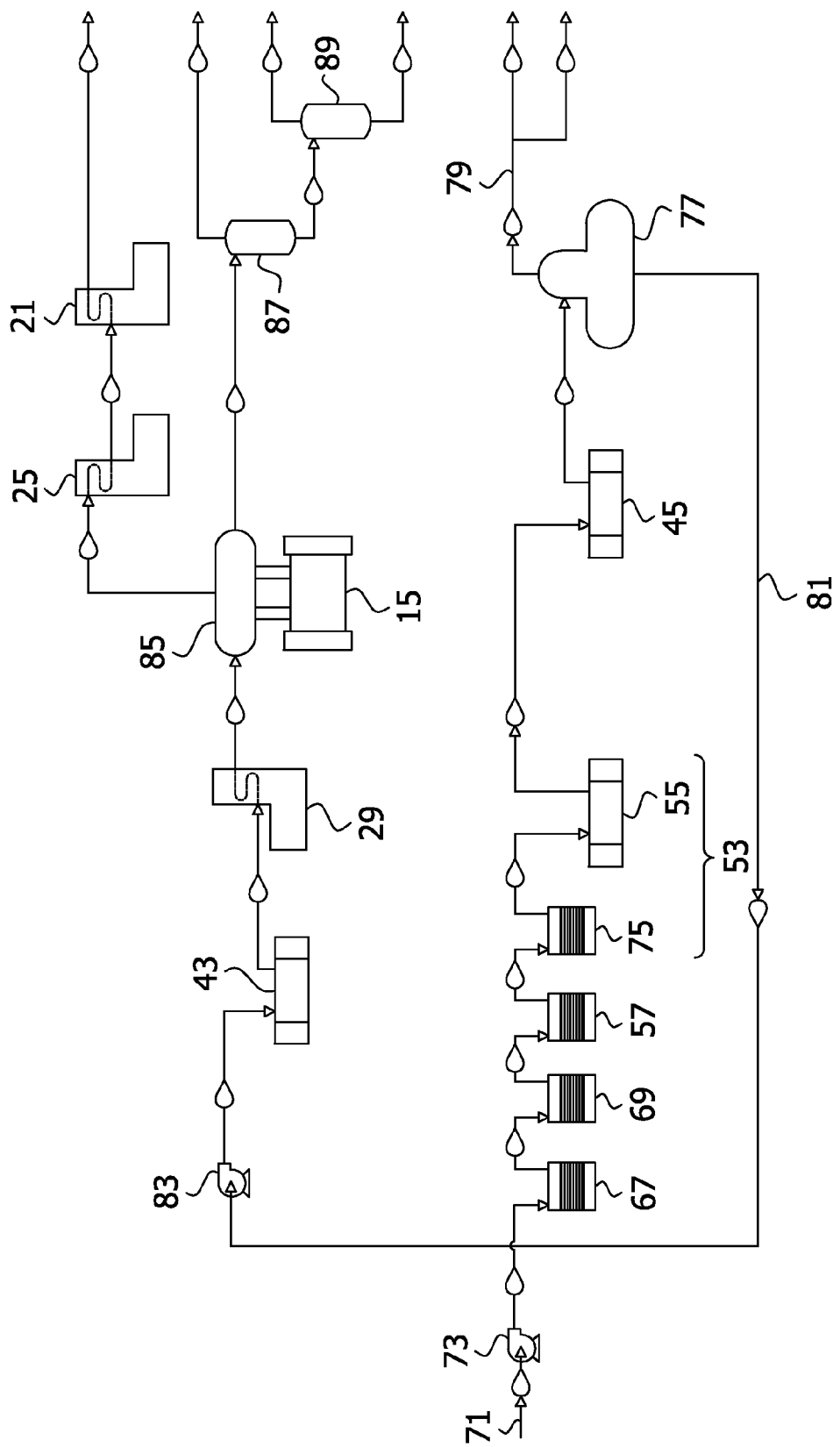
FIG. 2 is a boiler feed water and steam side schematic flow sheet of the preferred embodiment of FIG. 1.

FIG. 2 illustrates the utility side of the process of FIG. 1, i.e., the side of the process wherein boiler feed water is heated and steam generated from boiler feed water. Boiler feed water 71 at ambient or slightly above, typically at 70° to 100° F., is delivered to the utility side of the process at a pressure of typically 25 to 100 psig by a low pressure boiler feed water pump 73. Boiler feed water is then passed through product acid cooler 67 of the fourth heat transfer system where it is typically heated by 5 to 20 Fahrenheit degrees, e.g., to a temperature in the range of 90° to 115° F., by transfer of heat from HRS acid. The heated feed water exiting cooler 67 is then directed to secondary absorption acid cooler 69 of the fifth heat transfer system wherein it is further heated, e.g., by 5 to 15 Fahrenheit degrees, by transfer of heat from HRS acid, and exits the exchanger at a temperature typically in the range of 95° to 120° F. Although the fourth and fifth heat transfer systems are in parallel on the acid side in the embodiment of the process as illustrated in FIG. 1, they are in series on the boiler feed water side as illustrated in FIG. 2.

Boiler feed water exiting secondary absorption acid cooler 69 then enters the third heat transfer system 53. As discussed above, system 53 may typically comprise a plurality of heat exchangers. However, on the utility side not all of these heat exchangers necessarily serve to transfer heat from absorption acid to boiler feed water. For example, as illustrated in FIGS. 1 and 2, the boiler feed water loop may be integrated with a process for recovery of sulfur dioxide from a source gas, e.g., sulfur dioxide in the tail gas from heat recovery tower 33, in an absorption and stripping circuit according to a process such as that described in co-pending and co-assigned US patent applications Publication No. US 2012/0107209 A1, U.S. provisional patent application Ser. No. 61/641,833, filed May 2, 2012, and U.S. provisional patent application Ser. No. 61/793,571, filed Mar. 15, 2013, each of which are expressly incorporated herein by reference. In each of these processes, the sulfur dioxide is recovered from a gas such as an $SO_3$ absorber tail gas or other sulfur dioxide source by contacting the source gas with an aqueous absorption medium comprising a sorbent for sulfur dioxide to produce an absorption liquor enriched in $SO_2$, and the absorption liquor is thereafter heated in a stripper for desorption and recovery of $SO_2$.

Thus, as illustrated in FIG. 2, both boiler feed water and the forward acid flow stream pass countercurrently through heat exchangers 57 and 55, but, between these two exchangers, the boiler feed water passes through another (sixth) heat exchanger 75 in which the boiler feed water is heated by transfer of heat from a hot process stream in a process for recovery of $SO_2$ from an $SO_2$ source gas such as the tail gas from absorber 33. In an absorption and stripping circuit for recovery of $SO_2$, the process stream from which heat is transferred in exchanger 75 would typically be regenerated $SO_2$ absorption medium being returned to the $SO_2$ absorber after the $SO_2$ has been stripped from enriched absorption liquor, typically by injection of live steam into the enriched absorption liquor flowing countercurrently to the steam in an $SO_2$ stripping column. In this manner the energy supplied in the stripping steam is ultimately recovered in the form of high pressure steam from the waste heat boiler of the sulfuric acid manufacturing facility with which the $SO_2$ recovery process is integrated. Since the $SO_2$ stripping steam is supplied at relatively low pressure, this represents a further upgrade in the quality of the energy recovered.

Although heat exchanger 75 is in a series of heat exchangers wherein boiler feed water is progressively heated, it is technically outside the array of heat exchangers in series wherein heat is transferred from HRS acid to boiler feed water. This does not disturb the series arrangement of the array, but simply injects another operation into the series on the boiler feed water side. In the embodiment of FIG. 2, as will presently be discussed, yet another operation extraneous to the array of heat exchangers is introduced between another two successive heat exchangers in the series, with an effect that contributes materially to the recovery of a high proportion of the $SO_3$ absorption energy, or $SO_3$ absorption energy plus sulfuric acid heat of formation and heat of condensation, or all these plus the $SO_2$ stripping steam, in the form of high pressure steam.

In any event, the boiler feed water is typically heated in heat exchanger 57 by 40 to 70 Fahrenheit degrees, e.g., to a temperature in the range of 150° to 160° F. By transfer of heat from the $SO_2$ recovery process stream, the boiler feed water is further heated in exchanger 75 by another 40 to 70 Fahrenheit degrees, e.g., to a temperature in the range of 175° to 215° F. Feed water exiting exchanger 75 in this temperature range is typically heated in exchanger 55 to a temperature slightly to moderately above the ambient boiling point, e.g., in the range of 220° to 260° F. The pressure in exchanger 55 preferably remains just high enough to maintain the feed water in the liquid state.

Feed water exiting exchanger 55 is transferred to second heat exchanger 45 where further heat is transferred from HRS acid to the feed water. The temperature rise of the boiler feed water in exchanger 45 is modest. Depending on the pressure drop profile of the boiler feed water path, modest flashing may occur in heat exchanger 45, potentially resulting in even a slight decrease in the feed water temperature in passage through the second heat exchanger. For example, the boiler feed water, or two phase water/steam flow exiting the second heat exchanger 45 may typically be in the range of 220° to 240° F. at a pressure in the range of 3 to 15 psig.

The boiler feed water or two phase water and steam flow exiting second heat exchanger 45 is introduced into a de-aerating chamber 77, preferably operating substantially adiabatically, wherein the feed water flashes and cools by 10 to 15 Fahrenheit degrees compared to the temperature of the boiler feed water exiting exchanger 55 of the third heat transfer system. Flashing of the feed water in de-aerating chamber 77 removes non-condensables from the boiler feed water which are vented from the de-aerator through a line 79 to provide a source of injection steam for delivery to steam injection vessel 31. By flashing sufficient steam in de-aerator 77 to supply water vapor in a proportion representing a high percentage of the reaction water for absorber 33, operation of de-aerator 77 prevents the temperature rise in the boiler feed water system from reaching a level that would extinguish the Δt for transfer of energy from the HRS absorption acid to the boiler feed water further downstream with respect to feed water flow, and thereby allows essentially all the vapor phase acid formation, absorption and condensation energy from the HRS absorber to be recovered in the form of high pressure steam. Typically about 5% to about 10% of the boiler feed water entering de-aerator 77 is flashed therein.

In the embodiment illustrated in FIGS. 1 and 2, none of this energy is lost from recovery at high temperature because the low pressure steam exiting the de-aerator is recycled to steam injection vessel 31 as the source of steam for vapor phase reaction with $SO_3$. Absent this source of injection steam, energy from an extraneous source would be required to generate the injection steam. Optionally, but ordinarily less preferably, steam flashed in the de-aerator may be used as stripping steam in a co-ordinate process for recovery of $SO_2$ from heat recovery absorber tail gas.

Directing the steam flashed in the de-aerator to the absorber 33 also provides for convenient venting of the non-condensables from the boiler feed water with the tail gas from the absorber, thus removing them from the process without loss of steam. Moreover, it assures that the latent energy of the steam flashed at low pressure in the de-aerator is ultimately recovered in the form of high pressure steam.

De-aerated water 81 exiting the de-aerator at a temperature slightly to moderately above its ambient boiling point, e.g., 215° to 240° F., flows to the suction side of high pressure boiler feed water pump 83 from which the feed water is delivered to the waste heat boiler against the back pressure of the steam generated therein. Thus, the discharge pressure of pump 83 is typically in the range of 40 to 70 bar, more typically 50 to 70 bar. The feed water is transferred by pump 83 to economizer (first heat exchanger) 43 where the temperature of the feed water is increased typically by 175 to 225 Fahrenheit degrees, e.g., to a temperature in the range between about 420° and about 460° F., by transfer of heat from HRS acid. From economizer 43 the boiler feed water passes through economizer 29 wherein it is further heated, typically by 70 to 100 Fahrenheit degrees, e.g., to a temperature between about 490° and about 550° F., by transfer of heat from third stage conversion gas 27.

Boiler feed water exiting economizer 29 is converted to steam by transfer of heat from $SO_2$ combustion gas in waste heat boiler 15. Saturated steam at a pressure of 40 to 70 bar, more typically 50 to 70 bar, exits waste heat boiler 15 and passes first through superheater 25 where its temperature is increased by 10 to 20 Fahrenheit degrees, e.g., to a temperature in the range of 490° to 560° F., by transfer of heat from conversion gas 23 exiting the second converter stage 17.2 of converter 17. Superheated steam exiting superheater 25 passes through superheater 21 where it is further heated by 200 to 300 Fahrenheit degrees, e.g., to a temperature of 700° to 900° F., by transfer of heat from conversion gas stream 19 exiting first converter stage 17.1.

FIG. 2 also illustrates blowdown of condensate from steam drum 85 above waste heat boiler 15 for removal of particulate solid contaminants via a series of blowdown flash tanks, including high pressure blowdown tank 87 where condensate is flashed to low to moderate pressure steam typically at 2 to 5 bar gauge, and a low pressure blowdown tank 89 wherein condensate from blowdown tank 87 is flashed to yield additional steam at atmospheric pressure, leaving a residual condensate stream that is purged from the process for removal of the particulate solids.

Figure 3:
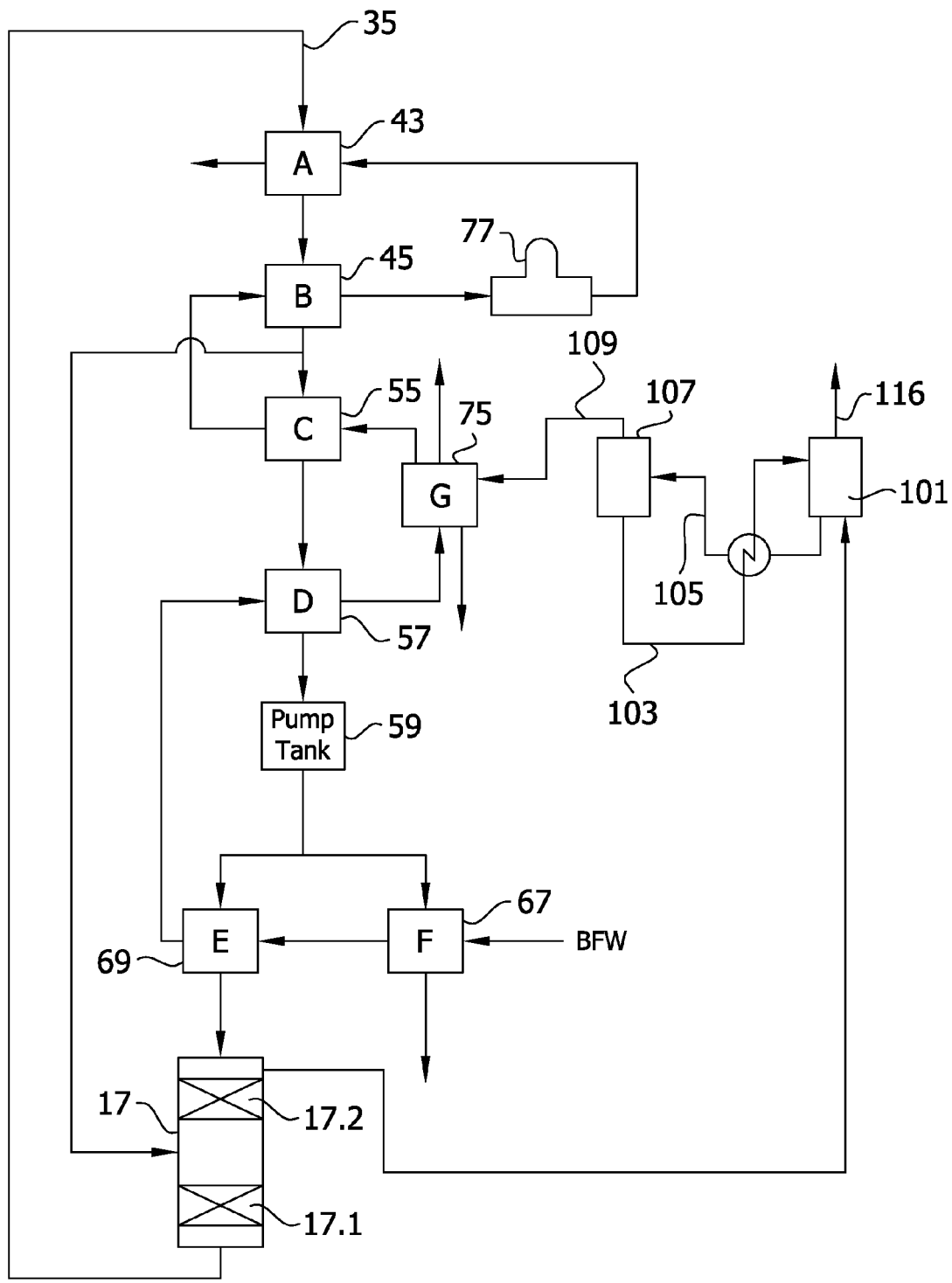
FIG. 3 is a schematic flow sheet integrating the flow sheets of FIGS. 1 and 2.

The alignment and relationship of the array of heat exchangers for transfer of energy from HRS acid is illustrated in FIG. 3 which combines the flowsheets of FIGS. 1 and 2 with respect to the flow of boiler feed water and HRS acid. FIG. 3 also depicts the integration of a contact sulfuric acid plant that comprises an HRS absorber for $SO_3$ with a process for recovering $SO_2$ from the tail gas exiting the $SO_3$ absorber. HRS acid generated in heat recovery absorption zone 17.2 of absorber 17 flows in series through economizer 43, second heat exchanger 45, and third heat transfer system exchangers 55 and 57 of the heat exchanger array, and, after passage through pump tank 59, flows in parallel through final product cooler 69 and secondary absorption acid cooler 67, each of which is in series with exchangers 43, 45, 55 and 57 with respect to HRS acid flow.

Boiler feed water enters the process at product acid cooler 67 and flows in series through the product acid cooler, the secondary absorption acid cooler 69, the third heat transfer system acid coolers 57 and 55, the second heat exchanger 45 and the economizer (first heat exchanger) 43 which constitute the array of heat exchangers in series with respect to which array the HRS acid and boiler feed water flow countercurrently. Between exchangers 57 and 55, the boiler feed water detours through heat exchanger 75 wherein it is heated by transfer of heat from a process stream of an $SO_2$ absorption and stripping system as also depicted in FIG. 3 and further described below. Heat exchanger 75 may be considered part of the third heat transfer system as referred to above, but is not part of the defined array of heat exchangers with respect to which the boiler feed water and HRS acid flow countercurrently in series.

Between heat exchanger 45 and economizer 43, the boiler feed water passes through de-aerator 77 wherein steam is flashed for removable of non-condensables. Flashing of steam in substantially adiabatic de-aerator 77 limits the temperature rise in the boiler feed water flowing through the process, and thus preserves a Δt for transfer of essentially all the absorption and condensation energy of the HRS system to boiler feed water for the waste heat boiler, thereby enabling recovery of essentially all the vapor phase acid formation, absorption and condensation energy (plus energy recovered from $SO_2$ stripping steam) in the form of high pressure steam generated by transfer of heat from $SO_2$ combustion gas in the waste heat boiler.

Tail gas exiting the secondary absorption zone 17.2 is fed to a sulfur dioxide absorption column 101 wherein residual $SO_2$ in the gas stream is absorbed into a solvent stream 103. Exhaust gas from absorber 101 substantially comprises nitrogen and a minor fraction of unreacted oxygen, and is of a quality proper for release into the atmosphere. Sulfur dioxide-enriched absorption liquor 105 exits the bottom of the $SO_2$ absorber and is transferred to a stripper 107 wherein $SO_2$ is stripped from heated absorption liquor, typically by contact with live steam. Hot stripper gas containing steam and sulfur dioxide 109 exiting stripping column 107 is passed through heat exchanger 75 wherein steam is condensed from the stripper gas 109 and heat is transferred from the hot steam with SO2 to boiler feed water during passage of the latter between heat exchanger 57 and 55, thereby increasing the temperature of the boiler feed water and ultimately allowing recovery in the form of high pressure steam of the latent heat of the stripping steam fed to $SO_2$ stripping column 107.

Figure 4:
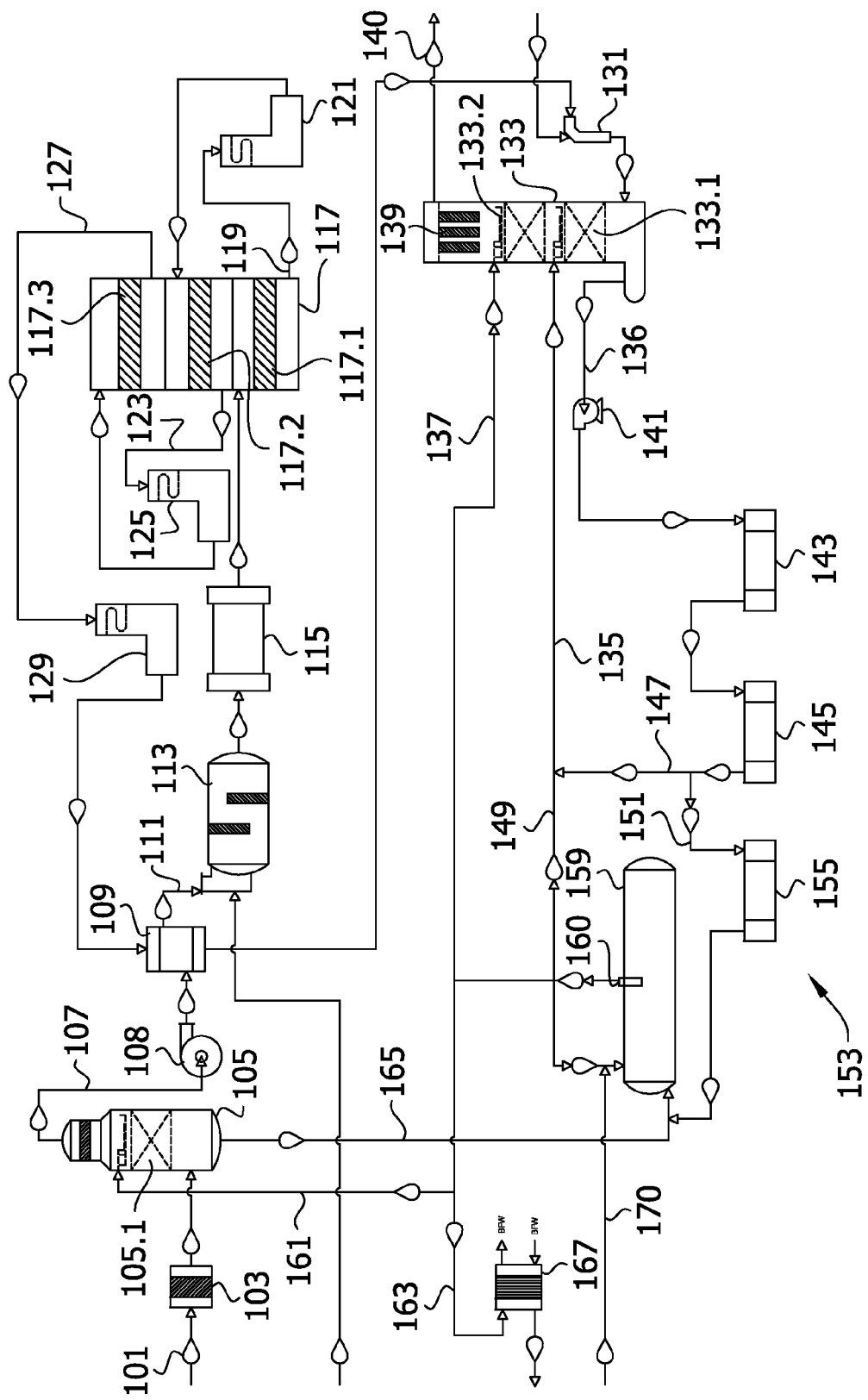
FIG. 4 is a schematic flow sheet of the process side of a modified form of the process of FIGS. 1 and 2.

Illustrated in FIG. 4 is an alternative embodiment of the process of the invention for recovery of the heat of absorption, vapor phase heat of formation of sulfuric acid, and heat of condensation in a high temperature $SO_3$ (HRS) absorption system in the form of high pressure steam.

Ambient air 101 flows through an inlet air filter 103 into an air inlet at the bottom of an air drying tower 105 where humidity is removed from the air by contact with concentrated sulfuric acid in a gas liquid contact zone 105.1 within the tower. As further described below, the concentrated acid circulated through the drying tower comprises absorption acid from an HRS absorber, the acid having been cooled by transfer of absorption heat to boiler feed water in a series of heat exchangers arrayed so that the absorption acid and the boiler feed water pass countercurrently with respect to the series of exchangers.

Dry air 107 at a temperature of 150-170° F. exiting drying tower 105 is compressed by compressor 108 and introduced into air preheater 109 where it is heated to 425° to 475° F. by transfer of heat from a conversion gas stream as described below. Molten sulfur is sprayed into sulfur burner 113 wherein it is contacted with heated compressed air 111 flowing at a rate such that the oxygen component of the air is in stoichiometric excess relative to the sulfur flow entering the burner. Sulfur reacts with oxygen of the air to produce a combustion gas comprising sulfur dioxide, nitrogen and unreacted oxygen. The $SO_2$ combustion gas exits the sulfur burner at 2100° to 2200° F. and is thereafter cooled to a temperature of 700-800° F. by transfer of heat to boiler feed water in waste heat boiler 115.

Combustion gas exiting waste heat boiler 115 flows to converter 117, enters first converter stage 117.1, and is contacted therein with a catalyst for the oxidation of sulfur dioxide to sulfur trioxide by reaction with the oxygen component of the gas. From the heat of the catalytic oxidation reaction, the conversion gas 119 exiting first converter stage 117.1 is typically at a temperature of 1100° to 1150° F. The first stage converter gas 119 is passed through a superheater 121 where heat is transferred to high pressure steam from the waste heat boiler as described hereinbelow, thereby cooling the conversion gas to about 775° to 825° F. In addition to recovery of the conversion heat, cooling the gas establishes a more favorable equilibrium for further conversion of $SO_2$ to $SO_3$ in second catalytic converter stage 117.2 to which the conversion gas flows from superheater 121.

Conversion gas 123 exiting second conversion stage 117.2 at a temperature of 925° to 975° F. flows to another superheater 125 where heat is transferred from gas stream 123 to high pressure steam from the waste heat boiler as also described below. Second stage conversion gas exiting superheater 125 at a temperature of typically 775° F. to 825° F. is directed to third and final catalytic converter stage 117.3 of converter 117 for further conversion of $SO_2$ to $SO_3$. Again, cooling the gas ahead of stage 117.3 provides a more favorable equilibrium therein for further conversion to $SO_3$. Third stage conversion gas 127 exits the converter at a temperature of 820° to 860° F. and is passed through an economizer 129 where heat is transferred to boiler feed water for the waste heat boiler, as further described below. Conversion gas exiting economizer 129 passes through air preheater 109 where heat is transferred from the gas to combustion air. After exiting the air preheater, the conversion gas is directed to the heat recovery absorption system. Passage of the conversion gas through the economizer reduces the gas temperature from the range between about 820° and about 860° F. by 250 to 320 Fahrenheit degrees, i.e., to a temperature in the range between about 525° and about 575° F., and further cooling in the air preheater reduces the temperature of the gas by another 170 to 200 Fahrenheit degrees, i.e. to a temperature typically in the range of 320° to 400° F.

In the process of FIG. 4, the gas is cooled in air preheater 109 by an extra increment in temperature in order to accommodate the sharp increase in temperature that occurs upon steam injection upstream of the absorber as described immediately below. The energy transferred in the economizer 129 and air preheater 109 is all recovered in the form of high pressure steam in waste heat boiler 115.

Final stage conversion gas 127 at 320° to 400° F. and 0.6 to 0.8 bar gauge is introduced into a steam injection vessel 131, where low pressure steam is introduced into the gas stream at stoichiometric ratio to the sulfur trioxide content thereof of most preferably about 0.80 to about 0.90. More broadly, the preferred rates of steam injection for the process of FIG. 4 are substantially as described above for the process of FIG. 1.

In a typical material balance for the embodiment illustrated in FIG. 4, as in the process of FIG. 1, water vapor is injected to provide 85% of the reaction water for forming sulfuric acid from sulfur trioxide, and integration of the drying tower acid circuit with the absorption acid circuit provides all or substantially all the remaining reaction water by absorption of moisture from combustion air in drying tower 105. Thus, nearly 100% of the heat of condensation of the water of reaction is recovered, plus significant additional energy from the heat of condensation of sulfuric acid. In any event, in the process of FIG. 4, the injection of water vapor and resultant vapor phase formation of sulfuric acid by reaction of $SO_3$ and water vapor typically heats the conversion gas stream exiting injection vessel 131 to a temperature typically in the range of 525° to 625° F. This gas stream is introduced into a gas inlet near the bottom of heat recovery absorption tower 133 below heat recovery absorption zone 133.1. Heat recovery zone 133.1 preferably comprises means for promoting mass transfer between the gas phase and the liquid phase. In the heat recovery absorption zone, the gas stream is contacted with absorption acid 135 which enters the heat recovery absorber, typically an absorption tower, at a temperature between about 370° F. and about 450° F. and a concentration of 99.0% to 99.4%. The absorption acid enters the top of the heat recovery zone and flows downwardly through zone 133.1 countercurrently to the gas stream. Operation of the heat recovery zone is substantially as described with respect to zone 33.1 of the process of FIG. 1.

As illustrated in FIG. 4, the heat recovery tower 133 preferably also includes a secondary absorption zone 133.2 where gas exiting the primary (heat recovery) absorption zone is contacted with a secondary absorption acid stream 137 in secondary absorption zone 133.2 which also operates substantially as described above with reference to zone 33.2 of FIG. 1. The secondary absorption acid exits the bottom of the secondary absorption zone and is combined with absorption acid entering the heat recovery tower between the bottom of the secondary zone and the top of the primary zone to form a combined acid stream that functions as the primary absorption acid for the heat recovery absorption zone.

The gas stream exiting the top of the secondary absorption and cooling zone 133.2 passes through sulfuric acid mist eliminators 139 and exits as tail gas 140 from the process. Optionally, sulfur dioxide may be recovered from the tail gas in a sulfur dioxide recovery process that may optionally be integrated with the $SO_3$ absorption heat recovery process as further described above.

From the vapor phase heat of formation of sulfuric acid, heat of absorption, heat of condensation, and sensible heat transfer, the enriched absorption acid 136 exiting the heat recovery absorption zone is heated to a temperature between about 400° F. and about 480° F. Hot absorption acid from the heat recovery absorption zone flows in series through an array of heat exchangers in which heat is transferred to boiler feed water for waste heat boiler 115. The boiler feed water generally also flows in series through the array of exchangers, with the absorption acid and boiler feed water flowing substantially countercurrently with respect to the series of exchangers.

On the acid side, the enriched absorption acid 136 exiting the heat recovery zone 133.1 into the well of heat recovery tower 133 flows to the suction side of an HRS acid circulating pump 141 from whence it is delivered first to an HRS economizer 143 where the acid is cooled from a temperature in the range of 400° to 480° F. to a temperature in the range of 380° to 430° F., typically by between about 10 and about 40 Fahrenheit degrees, by transfer of heat to hot boiler feed water, thereby heating the hot boiler feed water from approximately the ambient boiling point or somewhat above to temperature in the range of 375° to 425° F., typically by 150 to 225 Fahrenheit degrees.

Exiting the first heat exchanger (economizer) 143, the acid stream passes through a second HRS heat exchanger 145 where the acid is further cooled from a temperature in the range of about 380° and about 430° F. to a temperature between about 370° and about 400° F., typically by between 15 and about 30 Fahrenheit degrees, by transfer of heat to boiler feed water, and where the boiler feed water is heated in a temperature range close to its ambient boiling point.

Acid exiting second heat exchanger 145 is divided between a primary absorption acid recirculation stream 147 and a forward acid flow stream 151. Primary recirculation stream 147 is mixed with an acid stream 149 that comprises acid from drying tower 105 to provide primary absorption acid stream 135 that is then recirculated to the top of heat recovery absorption zone 133.1. The forward acid flow stream 151 flows next to a third heat transfer system 153 which may optionally comprise a plurality of heat exchangers, though not all of these heat exchangers necessarily serve to transfer heat from absorption acid to boiler feed water, and any that do not are therefore outside the defined array of heat exchangers that are arranged in series for the latter purpose. In the embodiment of FIG. 4, the third heat transfer system on the acid side comprises only boiler feed water preheater 155. In preheater 155, the acid is cooled from a temperature of between 370° and about 400° F. to a temperature in the range between about 130° and about 160° F., typically by between 225 and 270 Fahrenheit degrees, thereby heating boiler feed water from a temperature between about 175° and about 250° F. to a temperature between about 220° and about 260° F.

Downstream of heat exchanger 155 the HRS acid is divided to provide both a product acid stream and a secondary absorption acid stream for recirculation to secondary absorption zone 133.2. Preferably, division of HRS acid stream is preceded by delivery of forward flow stream 151 to a common reservoir, i.e., common acid pump tank 159 as illustrated in FIG. 4 which also receives drying tower acid returned from drying tower 105 and optionally, demineralized water 170 to function as supplemental dilution water for reaction with $SO_3$ in the heat recovery absorption tower 133. The resulting mixture, as drawn from common acid pump tank by common acid pump 160, is divided to yield secondary absorption acid stream 137 that is returned to the secondary absorption zone 133.2 of heat recovery absorber 133, a cooled primary recycle stream 149 that is mixed with relatively hot recycle stream 147 to produce primary absorption acid stream 135, a drying tower acid feed stream 161 that is directed to the drying tower, and product acid stream 163 that is removed from the process.

Typically, the temperature of acid in common pump tank 159 is in the range of 140° to 180° F. Drying tower acid stream 161 at the temperature of the pump tank is typically heated by about three Fahrenheit degrees by the heat of absorption of water vapor from the combustion air in drying tower 105. Spent drying tower acid 165, diluted by absorption of water vapor from the combustion air, is returned to the pump tank in the embodiment illustrated in FIG. 4.

Product acid 163 is cooled from the pump tank temperature to a temperature in the range of 80° to 115° F., typically by about 40 to 70 Fahrenheit degrees, by transfer of heat to boiler feed water in a fourth heat transfer system comprising a product acid cooler 167, thereby heating the boiler feed water from a temperature typically at ambient or moderately elevated above ambient to a temperature 5 to 15 Fahrenheit degrees higher.

Optionally, the secondary absorption acid returned from the pump tank to the secondary absorption zone is further cooled by transfer of heat to boiler feed water in a fifth heat transfer system comprising a secondary absorption acid cooler (not shown). Heat exchanger 167 comprises part of an array of exchangers in series, the array further comprising exchangers 155, 145 and 143. Flow of boiler feed water and absorption acid is countercurrent with respect to the series of heat exchanger comprising the array.

Figure 5:
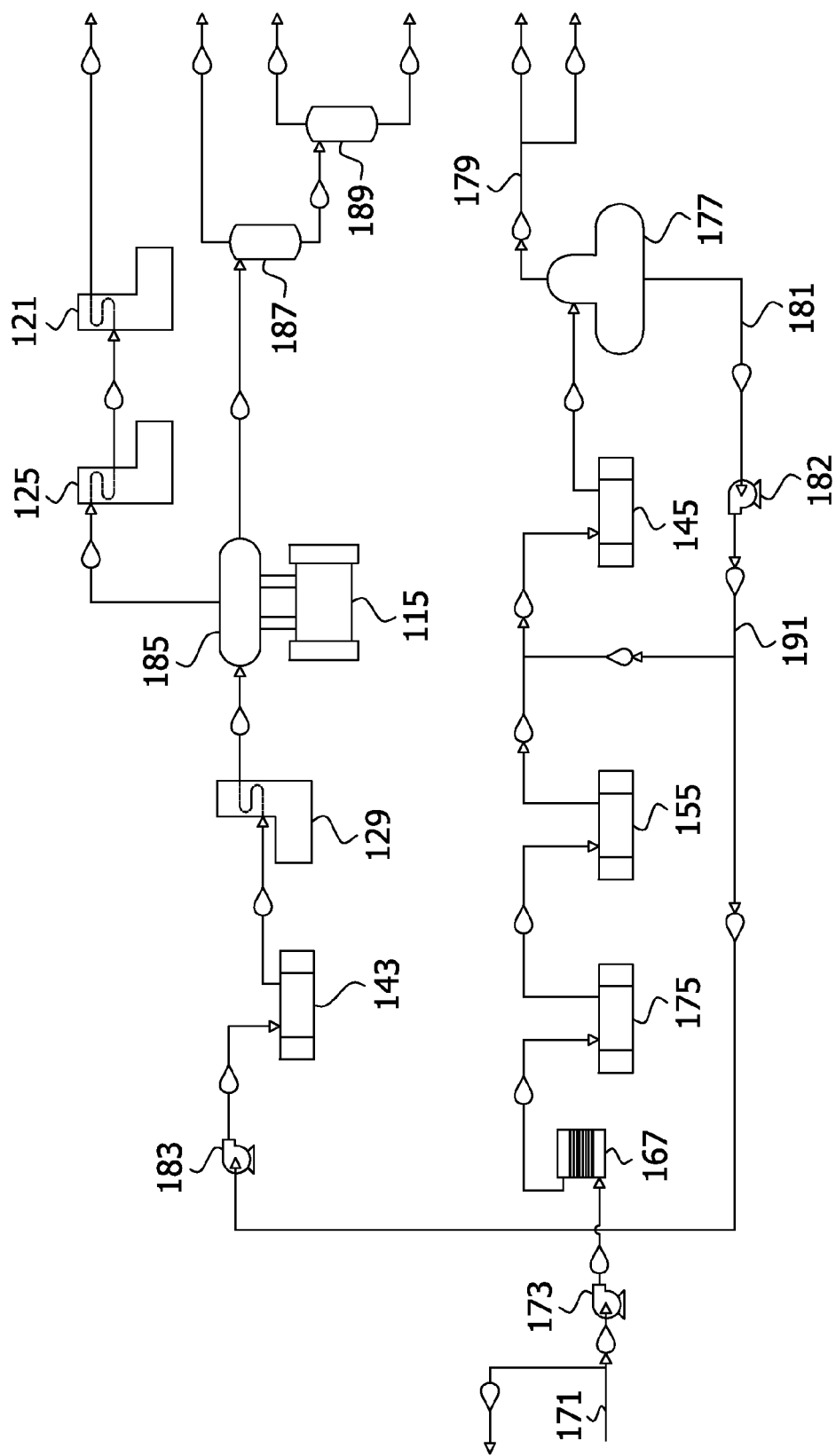
FIG. 5 is a boiler feed water and steam side schematic flow sheet of the preferred embodiment of FIG. 5.

FIG. 5 illustrates the utility side of the process of FIG. 4. Boiler feed water 171 at ambient or slightly above, typically at 70° to 100° F., is delivered to the utility side of the process at a pressure of typically 25 to 100 psig by a low pressure boiler feed water pump 173. Boiler feed water is then passed through product acid cooler 167 of the fourth heat transfer system where it is typically heated by 5 to 20 Fahrenheit degrees, e.g., to a temperature in the range of 90° to 115° F., by transfer of heat from HRS acid. Boiler feed water exiting product acid cooler 167 then enters the third heat transfer system 153. As discussed above, system 153 may typically comprise a plurality of heat exchangers. However, on the utility side not all of these heat exchangers necessarily serve to transfer heat from absorption acid to boiler feed water. For example, the boiler feed water loop may be integrated with a process for recovery of sulfur dioxide from a source gas, e.g., sulfur dioxide in the tail gas from heat recovery tower 133, in an absorption and stripping circuit according to a process such as that described in co-pending and co-assigned US patent applications Publication No. US 2012/0107209 A1, U.S. provisional patent application Ser. No. 61/641,833, filed May 2, 2012, and U.S. provisional patent application Ser. No. 61/793,571, filed Mar. 15, 2013.

Thus, as illustrated in FIG. 5, boiler feed water exiting product acid cooler 167 at a temperature of 90° to 115° F. passes first through heat exchanger 175 wherein heat is transferred to the boiler feed water from a regenerated sulfur dioxide absorption medium stream, thereby heating the feed water by typically 25 to 45 Fahrenheit degrees, e.g., to a temperature between about 120° and about 140° F. The source of the regenerated sulfur dioxide absorption medium is as described above with reference to FIG. 2.

Although heat exchanger 175 is in a series of heat exchangers wherein boiler feed water is progressively heated, it is technically outside the array of heat exchangers in series wherein heat is transferred from HRS acid to boiler feed water. This does not disturb the series arrangement of the array, but simply injects another operation into the series exchangers on the boiler feed water side. As in the embodiment of FIG. 2, the embodiment of FIG. 5 includes another operation extraneous to the array of heat exchangers, i.e., a deaerator for the boiler feed water, between another two successive heat exchangers in the series.

Feed water exiting heat exchanger 175 flows to heat exchanger 155 where it is typically heated by 140 to 180 Fahrenheit degrees, e.g., to a temperature in the range of 270° to 310° F.

Feed water exiting exchanger 155 is mixed with a portion of de-aerated water 191 at 215° to 240° F. from boiler feed water circulating pump 182 which circulates feed water between heat exchanger 155 and de-aerator 177 as further described hereinbelow. The mixed stream, typically at a temperature in the range of 230° to 280° F., enters second heat exchanger where it is further heated, e.g., by 25 to 45 Fahrenheit degrees to a temperature in the range of 270° to 300° F., by transfer of heat from HRS acid. Depending on the pressure drop profile of the boiler feed water path, modest flashing may occur in heat exchanger 145, potentially limiting the extent to which the feed water temperature is increased during passage through the second heat exchanger.

The boiler feed water or two phase water and steam flow exiting second heat exchanger 145 is introduced into a preferably substantially adiabatic de-aerating chamber 177 wherein the feed water flashes and cools by 15 to 80 Fahrenheit degrees compared to the temperature of the boiler feed water exiting exchanger 155 of the third heat transfer system. Flashing of the feed water in de-aerating chamber 177 removes non-condensables from the boiler feed water which are vented from the de-aerator through a line 179 to provide a source of injection steam for delivery to steam injection vessel 131. By flashing sufficient steam in de-aerator 177 to supply water vapor in a proportion representing a high percentage of the reaction water for absorber 133, operation of de-aerator 177 prevents the temperature rise in the boiler feed water system from reaching a level that would extinguish the $\Delta t$ for transfer of energy from the HRS absorption acid to the boiler feed water further downstream with respect to feed water flow, and thereby allows essentially all the vapor phase acid formation, absorption and condensation energy from the HRS absorber to be recovered in the form of high pressure steam. Typically about 5% to about 10% of the boiler feed water entering de-aerator 177 is flashed therein.

In the embodiment illustrated in FIGS. 4 and 5, none of this energy is lost from recovery at high temperature because the low pressure steam exiting the de-aerator is recycled to steam injection vessel 131 as the source of steam for vapor phase reaction with $SO_3$. Absent this source of injection steam, energy from an extraneous source would be required to generate the injection steam. Optionally, but ordinarily less preferably, steam flashed in the de-aerator may be used as stripping steam in a co-ordinate process for recovery of $SO_2$ from heat recovery absorber tail gas.

Directing the steam flashed in the de-aerator to the absorber 133 also provides for convenient venting of the non-condensables from the boiler feed water with the tail gas from the absorber.

De-aerated water 181 at a temperature slightly to moderately above its ambient boiling point, e.g., 215° to 240° F., is circulated via high volume pump 182 between heat exchanger 145 and the de-aerator. At the discharge of circulation pump 182, the feed water is divided between the recirculation stream that flows back to the boiler feed water inlet of heat exchanger 145 and feed water for the waste heat boiler that flows to the suction side of high pressure boiler feed water pump 183. From high pressure pump 183, the feed water is delivered to the waste heat boiler against the back pressure of the steam generated therein. Thus, the discharge pressure of pump 183 is typically in the range of 40 to 70 bar, more typically 50 to 70 bar. The feed water is transferred by pump 183 to economizer (first heat exchanger) 143 where the temperature of the feed water is increased typically by 150 to 200 Fahrenheit degrees, e.g., to a temperature in the range between about 375° and about 425° F., by transfer of heat from HRS acid. From economizer 143 the boiler feed water passes through economizer 129 wherein it is further heated, typically by 100 to 140 Fahrenheit degrees, e.g., to a temperature between about 490° and about 550° F., by transfer of heat from third stage conversion gas 127 (FIG. 4).

Boiler feed water exiting economizer 129 is converted to steam by transfer of heat from $SO_2$ combustion gas in waste heat boiler 115. Saturated steam at a pressure of 40 to 70 bar, more typically 50 to 70 bar, exits waste heat boiler 115 via steam drum 185 and passes first through superheater 125 where its temperature is increased by 10 to 20 Fahrenheit degrees, e.g., to a temperature in the range of 490° to 560° F., by transfer of heat from conversion gas 123 exiting the second converter stage 117.2 of converter 17 (FIG. 4). Superheated steam exiting superheater 125 passes through superheater 121 where it is further heated by 225 to 325 Fahrenheit degrees, e.g., to a temperature of 750° to 850° F., by transfer of heat from conversion gas stream 119 exiting first converter stage 117.1 (FIG. 4).

FIG. 5 also illustrates blowdown of condensate from steam drum 185 above waste heat boiler 115 for removal of particulate solid contaminants via a series of blowdown flash tanks, including high pressure blowdown tank 187 where condensate is flashed to low to moderate pressure steam typically at 2 to 5 bar gauge, and a low pressure blowdown tank 189 wherein condensate from blowdown tank 187 is flashed to yield additional steam at atmospheric pressure, leaving a residual condensate stream that is purged from the process for removal of the particulate solids.

Figure 6:
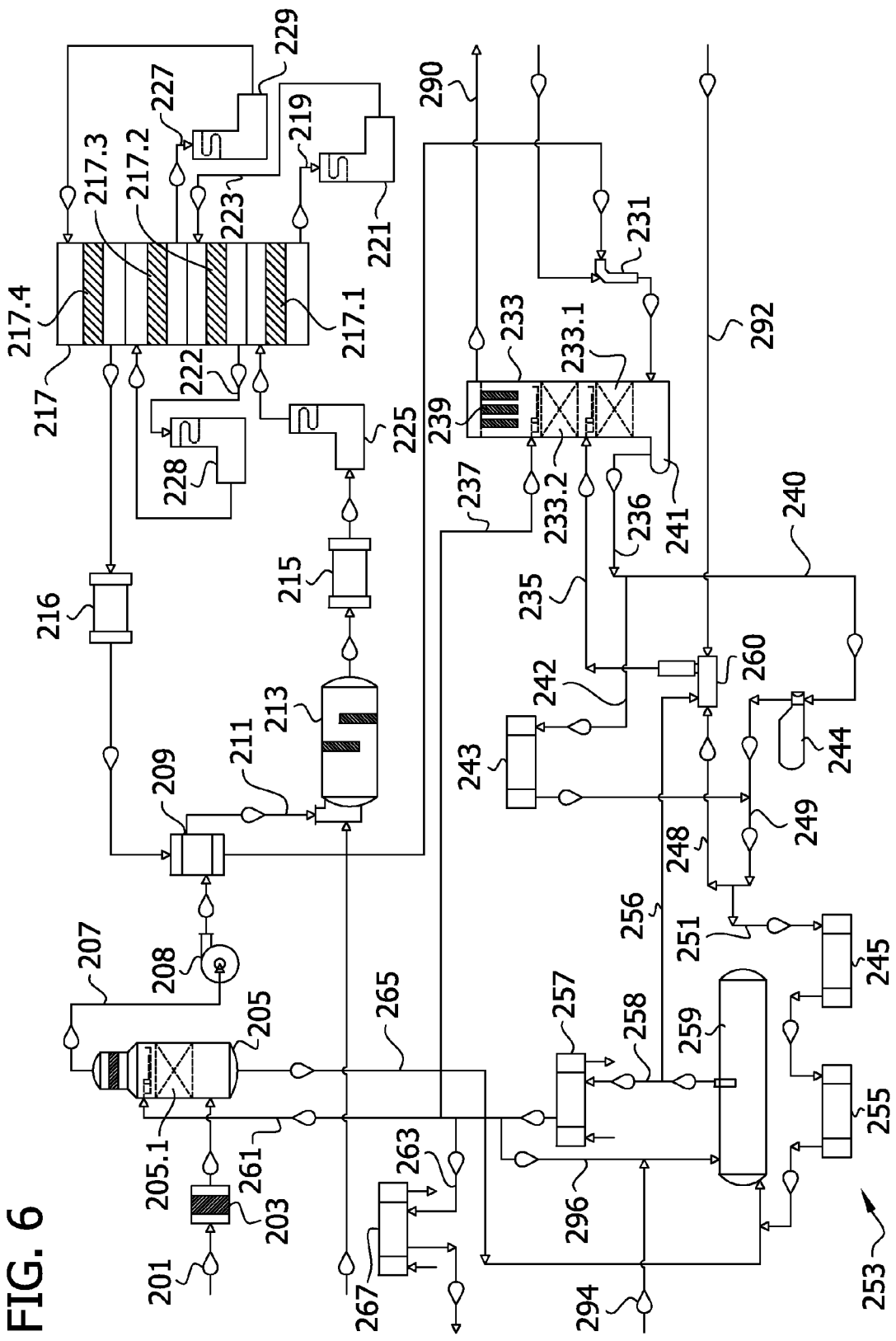
FIG. 6 is a process side schematic comparable to FIG. 1 for an alternative embodiment of the invention wherein heat generated in an HRS absorption system is divided between generation of intermediate pressure steam in an HRS boiler and heating of boiler feed water for the $SO_2$ combustion gas waste heat boiler.

FIG. 6 illustrates an alternative embodiment of the process side of a sulfuric acid manufacturing process in which a fraction of the energy generated in the heat recovery and secondary absorption zones of the HRS absorber is recovered in the form of intermediate pressure steam in an HRS boiler, and the remainder is recovered in the form of high pressure steam by transfer of heat from the HRS absorption acid to boiler feed water for high pressure boiler, in this case the waste heat boiler in which heat is recovered from $SO_2$ combustion gas. In a preferred mode of operation of the process of FIG. 6, at least 60% of the vapor phase heat of sulfuric acid formation, heat of absorption and condensation generated in the heat recovery zone is ultimately recovered in the form of steam having a pressure in the range of 40 to 70 bar. More preferably, at least 75% of the HRS energy is recovered in the form of steam having a pressure in such range. Even more preferably, at least about 85%, 90%, 95% 97% or 99% of the sum of the vapor phase heat of acid formation, heat of absorption and heat of condensation generated in the heat recovery absorber is recovered in the form of high pressure steam, i.e., steam having a pressure in the 40 to 70 bar range.

In the process of FIG. 6, ambient air 201 flows through an inlet air filter 203 into an air inlet at the bottom of an air drying tower 205 where humidity is removed from the air by contact with concentrated sulfuric acid in a gas liquid contact zone 205.1 within the tower. As in the process of FIG. 1, the concentrated acid circulated through the drying tower comprises absorption acid from an HRS absorber that has been cooled by transfer of absorption heat to boiler feed water that is passed through a series of heat exchangers that are arrayed so that the absorption acid and the boiler feed water pass countercurrently with respect to the series of exchangers.

Dry air 207 at a temperature of 130-150° F. exiting drying tower 205 is compressed by compressor 208, thereby heating the air to a temperature of 220° to 260° F., and introduced into air preheater 209 where it is heated to 440-480° F. by transfer of heat from final stage $SO_2$ conversion gas as described below. Molten sulfur is sprayed into sulfur burner 213 wherein it is contacted with heated air 211 flowing at a rate such that the oxygen component of the air is in stoichiometric excess relative to the sulfur flow. Sulfur reacts with oxygen of the air to produce a combustion gas comprising sulfur dioxide, nitrogen and unreacted oxygen. The $SO_2$ combustion gas exits the sulfur burner at 2150° to 2300° F. and is cooled to a temperature of 2000-2060° F. by transfer of heat to boiler feed water in a first waste heat boiler 215.

Combustion gas exiting waste heat boiler 215 passes through superheater 225 wherein the gas stream is cooled, typically by 1200 to 1400 Fahrenheit degrees, e.g., from a temperature of between 2000° and 2060° F. to a temperature of 700° to 800° F. that is appropriate to establish a favorable equilibrium for catalytic conversion of $SO_2$ to $SO_3$. In superheater 225, the gas is cooled by transfer of heat to high pressure steam generated in the waste heat boiler system, thereby heating the steam from a temperature in the range between about 540 and about 550 Fahrenheit degrees to a temperature in the range between about 650° and about 750° F.

Cooled combustion gas exiting superheater 225 enters first catalytic converter stage 217.1 of converter 217 wherein it is contacted with a catalyst for the oxidation of sulfur dioxide to sulfur trioxide by reaction with the oxygen component of the gas. The oxidation of sulfur dioxide to sulfur trioxide is highly exothermic, so that the conversion gas 219 exiting first converter stage 217.1 is typically at a temperature of 1100° to 1150° F. The first stage converter gas 219 is passed through a superheater 221 where heat is transferred from the conversion gas to high pressure steam from the waste heat boiler as described hereinbelow, thereby cooling the conversion gas to about 775° to 825° F. In addition to recovery of the conversion heat, cooling the gas establishes a more favorable equilibrium for further conversion of $SO_2$ to $SO_3$ in second catalytic converter stage 217.2 to which the conversion gas flows from superheater 221.

Conversion gas 222 exiting second conversion stage 217.2 at a temperature of 925° to 975° F. flows to another economizer 228 where heat is transferred from the gas stream to boiler feed water as also described below. Second stage conversion gas exiting economizer 228 at a temperature of typically 775° F. to 825° F. is directed to third catalytic converter stage 217.3 of converter 217 for further conversion of $SO_2$ to $SO_3$. Again, cooling the gas ahead of stage 217.3 provides a more favorable equilibrium therein for further conversion to $SO_3$. Third stage conversion gas 227 exits the converter at a temperature of 820° to 860° F. and is passed through an economizer 229 where the conversion gas is cooled by 70 to 100 Fahrenheit degrees, e.g., to 725° to 775°, by transfer of heat to boiler feed water for the waste heat boiler, as further described below. Conversion gas exiting economizer 229 is directed to fourth and final converter stage 217.4 for further conversion of $SO_2$ to $SO_3$. The gas stream is heated only moderately, e.g., 5 to 20 Fahrenheit degrees, e.g., to a temperature of 735° to 785° F., from the exothermic heat of oxidation generated in fourth converter stage 217.4. From stage 217.4, fourth stage conversion gas flows through second waste heat boiler 216 wherein it is cooled by about 200 to 250 Fahrenheit degrees, e.g., to a temperature in the range of 525° to 575° F., by generation of steam at a pressure of typically 750 to 850 psig. After passage through the second waste heat boiler 216, the final conversion gas flows through air preheater 209 where it is further cooled, typically by 195 to 225 Fahrenheit degrees, e.g., to a temperature between 325° and about 360° F., by transfer of heat to combustion air. As discussed above with reference to the process of FIG. 1, cooling of the conversion gas prior to entry into the steam injection vessel prevents the conversion gas from being too hot as it enters the heat recovery absorption zone.

Final stage conversion gas exiting air preheater 209 is directed to the heat recovery absorption system comprising heat recovery tower 233. Prior to entry into the heat recovery tower, the final converter gas passes through a steam injection vessel 231. Converter gas enters the injection vessel at a temperature of 325° to 360° F. and 0.05 to 0.2 bar. In vessel 231, steam is introduced into the gas stream to establish an equivalent $H_2O$ vapor content in the gas stream at a stoichiometric ratio to the equivalent sulfur trioxide content thereof that is preferably greater than about 0.55, 0.60 or 0.75, most preferably at least about 0.85, 0.90 or 0.95 optionally about 0.98. Injection of steam results in the vapor phase reaction of $SO_3$ and water to generate sulfuric acid vapor. Preferred minimum rates of steam injection into vessel 231 in the process of FIG. 6 are essentially the same as described above for the process of FIG. 1. The injection of water vapor and resultant vapor phase formation of sulfuric acid by reaction of $SO_3$ and water vapor heats the conversion gas stream exiting injection vessel 231 to a temperature typically in the range of 550° to 600° F. This gas stream is introduced into a gas inlet at or near the bottom of heat recovery absorption tower 233 below heat recovery absorption zone 233.1.

In the heat recovery absorption zone 233.1, the gas stream is contacted with primary absorption acid 235 which enters the heat recovery absorber, typically an absorption tower, at a temperature between about 125° and 165° F. and a concentration of 99.2% to 99.6%. The absorption acid enters the top of the heat recovery zone and flows downwardly through zone 233.1 countercurrently to the gas stream. Contact of absorption acid and gas in the heat recovery zone results in absorption of $SO_3$ into the liquid phase, condensation of sulfuric acid vapor from the gas phase into the liquid phase, and condensation of water vapor from the gas phase to the liquid phase. Sensible heat is also transferred from the gas phase to the liquid phase.

The heat recovery tower 233 preferably also includes a secondary absorption zone 233.2 where gas exiting the primary (heat recovery) absorption zone is contacted with a secondary absorption acid stream 237 that is introduced into the top of secondary absorption zone 233.2 and flows downwardly therethrough countercurrently to the gas stream flowing upwardly. The secondary absorption zone also includes packing or other means for promoting mass transfer between the acid phase and the liquid phase. Secondary absorption acid 237 enters the secondary absorption zone at a temperature typically in the range of 90° to 120° F. Contact of the gas stream exiting the primary absorption zone with secondary absorption acid in the secondary absorption zone results in absorption of residual $SO_3$ from the gas exiting the primary zone and cools the gas stream, resulting in further condensation of sulfuric acid vapor and water vapor into the secondary absorption acid. The secondary absorption acid exits the bottom of the secondary absorption zone and is combined with absorption acid entering the heat recovery tower between the bottom of the secondary zone and the top of the primary zone to form a combined acid stream that functions as the primary absorption acid for the heat recovery absorption zone.

The gas stream exiting the top of the secondary absorption and cooling zone 233.2 passes through sulfuric acid mist eliminators 239 and exits as tail gas 290 from the process. Optionally, sulfur dioxide may be recovered from the tail gas in a sulfur dioxide recovery process, and such sulfur dioxide recovery process may be integrated with the $SO_3$ absorption heat recovery process, as described above with reference to FIG. 1.

From the heat of absorption, heat of condensation, and sensible heat transfer, the enriched absorption acid exiting the heat recovery absorption zone is heated to a temperature between about 400° F. and about 460° F. Enriched absorption acid from the heat recovery absorption zone flows in series through an array of heat exchangers in which heat is transferred to boiler feed water for waste heat boilers 215 and 216. The boiler feed water generally flows in series through the array of exchangers, with the absorption acid and boiler feed water flowing substantially countercurrently with respect to the series of exchangers.

On the acid side, the absorption acid exiting the heat recovery zone into the well of heat recovery tower 233 flows to the suction side of an HRS acid circulating pump 241. On the discharge side of the circulating pump, the absorption acid is divided between an HRS boiler acid stream 240 and a by-pass HRS acid stream 242.

HRS boiler acid stream 240 flows through HRS boiler 244 where it is cooled by 30 to 60 Fahrenheit degrees, e.g., to a temperature in the range of 375° to 425° F., by transfer of heat to boiler feed water and generation of intermediate pressure steam, e.g., at a pressure of 120 to 150 psig. By-pass HRS stream 242 is directed to a first heat exchanger 243 in a series of heat exchangers in an array through which HRS acid and boiler feed water are passed countercurrently with respect to the array. In heat exchanger 243, the HRS acid is cooled from a temperature in the range between about 400° and about 460° F., typically by between about 5 and about 20 Fahrenheit degrees, e.g., to a temperature between about 395 and about 440° F., by transfer of heat to high pressure boiler feed water, thereby heating the high pressure boiler feed water to a temperature in the range between about 420 and about 438° F.

By-pass acid 242 exiting first heat exchanger 243 is recombined with HRS boiler acid 240 downstream of heat exchanger 243 and downstream of HRS boiler 244 with respect to the flow of HRS acid. Combined stream 249 is re-divided into stream 248, which comprises the main component of primary absorption acid stream 235 that is recycled to the heat recovery absorption zone 233.1, and a forward acid flow stream 251 from which further energy is recovered by transfer of heat to boiler feed water. In the course of recirculation to absorber 233, stream 248 passes through diluter 260 wherein dilution water ($SO_3$ reaction water) 292 may be added as necessary to maintain a target acid concentration profile across the heat recovery absorption zone. As described hereinbelow, stream 249 may be mixed in the diluter with a recycle stream from common pump tank 259 to form primary absorption acid stream 235. In preferred embodiments of the process of FIG. 6, substantially all $SO_3$ reaction water is provide by injection of steam into the conversion gas entering the heat recovery absorption zone or by the combination of steam injection and water removed from combustion air in drying tower 5, but adjustments in the rate of water addition may be effected by addition of demineralized water stream 292 at diluter 260.

Forward acid flow stream 251 is passed through a second heat exchanger 245 wherein the acid is cooled to a temperature in the range between about 220° and about 240° F., typically by about 160 to about 190 Fahrenheit degrees, by transfer of heat to intermediate pressure boiler feed water, thereby heating the boiler feed water to a temperature in the range between about 260° and about 290° F.

The secondary absorption acid stream 251 flows next to a third heat transfer system 253 which may typically comprise a plurality of heat exchangers. In FIG. 6 the third heat transfer system comprises boiler feed water preheater 255 and common acid cooler 257. In preheater 255, the acid is cooled from a temperature between 210° and about 240° F., typically by between 90 and 120 Fahrenheit degrees, to a temperature in the range between about 120° and about 140° F. thereby heating boiler feed water for the HRS boiler by typically 50 to 70 Fahrenheit degrees, e.g., from a temperature between about 90° and about 110° F. to a temperature between about 140° and about 160° F.

Acid exiting heat exchanger 255 flows into a common pump tank 259 which functions as a reservoir for HRS acid that is ultimately divided four ways, i.e.: (i) a product stream 263; (ii) a drying tower acid stream 261; (iii) a recirculated secondary absorption acid stream 237 for recycle to the secondary absorption zone 233.2 of heat recovery absorber 233; and (iv) a stream 256 that is combined with the exit stream 249 from HRS boiler 244 to form the primary absorption acid stream 235 recycled to heat recovery absorption zone 233.1. However, as it initially flows out of the pump tank, the acid stream is preferably divided only two ways, one of which is stream 256, the stream that forms a component of the primary absorption acid. Conveniently, stream 256 and recycle acid stream 249 exiting the HRS boiler may be mixed in diluter 260 to form primary absorption acid stream 235, which flows from the diluter back to the absorber at a point below secondary absorption zone 233.2 and above the heat recovery absorption zone 233.1.

The other stream formed by division of the acid stream exiting the pump tank, i.e., stream 258, is passed through common acid cooler 257 where it is cooled, typically by 5 to 20 Fahrenheit degrees, e.g., to a temperature in the range of 135° to 160° F., by transfer of heat to boiler feed water. Downstream of the common acid cooler, the cooled acid stream is divided into the product acid stream 263, the drying tower acid stream 261 and the secondary absorption acid stream 237. Stream 261 is directed to drying tower 205 for absorption of moisture from the incoming combustion air for the sulfur burner 213. In passage through the drying tower the drying tower acid stream is typically heated by 5 to 15 Fahrenheit degrees, typically to a temperature in the range of 135° to 160° F. Spent drying tower acid 265 flows back into common pump tank 259.

Product acid stream 263 is passed through product acid cooler 267 where it is cooled, typically by 50 to 100 Fahrenheit degrees, e.g., to a temperature between about 90° and about 160° F., by transfer of heat to boiler feed water, thereby heating the boiler feed water to a temperature in the range of 90° to about 120° F.

Secondary absorption acid stream 237 flows from common acid cooler 257 to heat recovery absorber 233 and enters the top of secondary absorption zone 233.2. Secondary absorption acid flows downwardly through zone 233.2, thereby removing residual $SO_3$ from the gas exiting the top of heat recovery absorption zone 233.1, cooling the gas stream and condensing sulfuric acid vapor from the gas stream. At the top of the primary (heat recovery) absorption zone 233.1 of heat recovery absorber 233, the secondary absorption acid exiting the secondary absorption zone combines with recirculated acid stream 235 to form the absorption acid for the primary absorption zone.

Gas exiting secondary absorption zone 233.2 is preferably passed through mist eliminator elements 239 for removal of residual sulfuric acid mist from the process tail gas.

Optionally, and additional source of dilution water 294 can be introduced into the common pump tank 259, e.g., by injection into a recirculating stream 296

Figure 7:
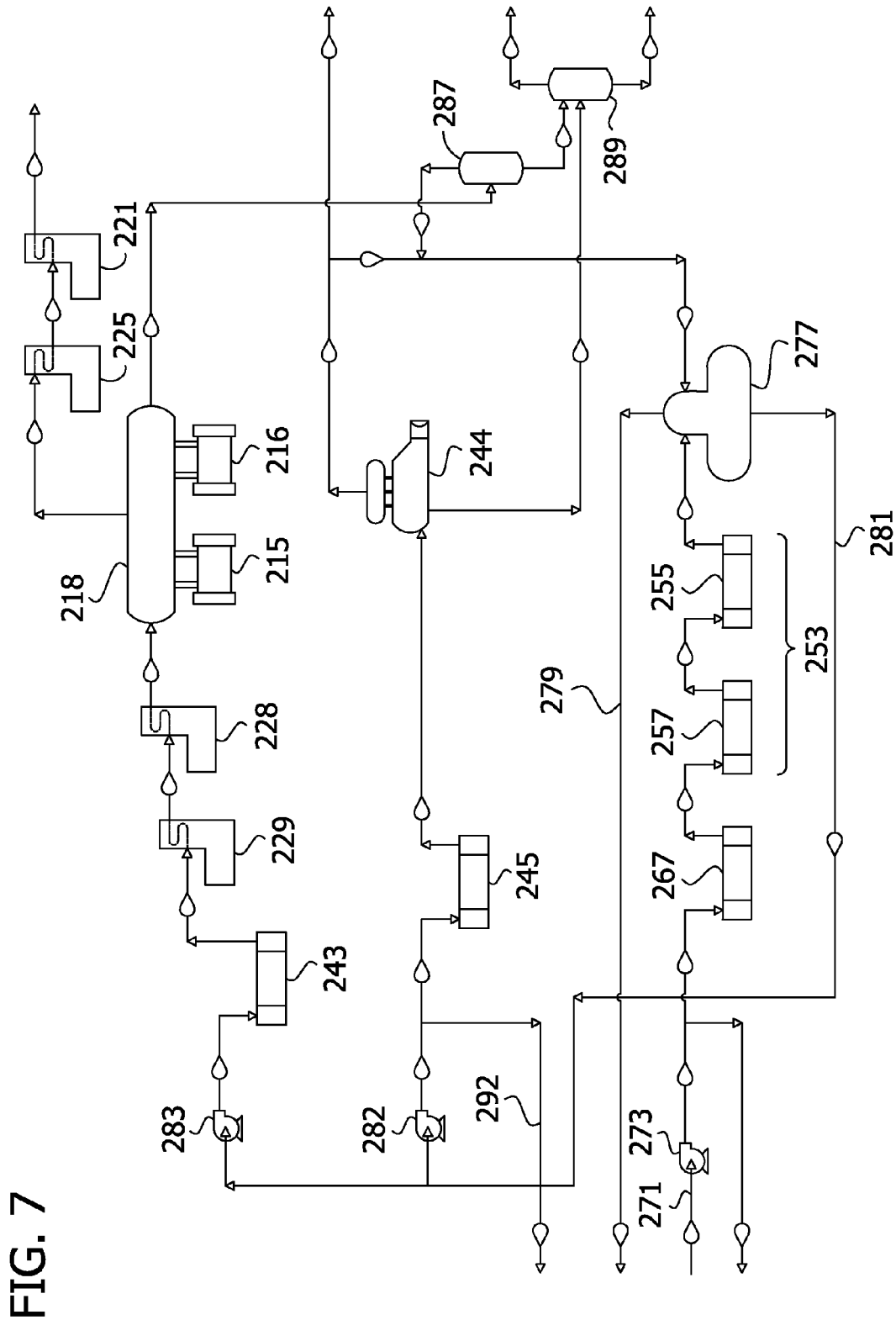
FIG. 7 is a boiler feed water and steam side schematic for the process of FIG. 6.

FIG. 7 illustrates the utility side flow sheet for the process illustrated in FIG. 6. Boiler feed water 271 at typically 70° to 110° F. is delivered to the suction side of low pressure boiler feed water pump 273. From the discharge of pump 273, boiler feed water first flows through product acid cooler 267 where it is heated, typically by 20 to 50 Fahrenheit degrees, e.g., to a temperature in the range of 90° and about 120°, by transfer of heat from HRS acid.

Feed water exiting heat exchanger 267 flows to third heat transfer system 253 comprising common acid cooler 257 and HRS preheater 255 in series. In common acid cooler 257, the boiler feed water is heated typically by 60 to 90 Fahrenheit degrees, e.g., to a temperature in the range of 150° and about 180°, by transfer of heat from HRS acid. Feed water exiting common acid cooler 257 flows to heat exchanger 255 wherein it is heated typically by 90 to 110 Fahrenheit degrees, e.g., to a temperature in the range of 260° and about 290°, by transfer of heat from HRS acid. Feed water exiting common acid cooler 255 flows to de-aerator 277 wherein it flashes and cools by 10 to 15 Fahrenheit degrees compared to the temperature of the boiler feed water exiting exchanger 255 of the third heat transfer system. Flashing of the feed water in de-aerating chamber 277 removes non-condensables which are vented from the de-aerator through a line 279 to provide a source of injection steam for delivery to steam injection vessel 231. By flashing sufficient steam in de-aerator 277 to supply water vapor in a proportion representing a high percentage of the reaction water for absorber 233, operation of de-aerator 277 prevents the temperature rise in the boiler feed water system from reaching a level that would extinguish the $\Delta t$ for transfer of energy from the HRS absorption acid to the boiler feed water, and thereby allows a high percentage of the absorption and condensation energy from the absorber to be recovered in the form of high pressure steam. Typically about 5% to about 10% of the boiler feed water entering de-aerator 277 is flashed therein. In the embodiment shown in FIG. 7, de-aeration is aided by diversion of a fraction of steam from the HRS boiler 244 to the de-aerator.

Directing the steam flashed in the de-aerator to the sulfur trioxide absorber also provides for convenient venting of the non-condensables in the boiler feed water with the tail gas from the absorber, thus removing them from the process without loss of steam. Moreover, it assures that the latent energy of the steam flashed at low pressure in the de-aerator is ultimately recovered in the form of high pressure steam.

De-aerated water 281 exiting the de-aerator at a temperature slightly to moderately above its ambient boiling point, e.g., 215° to 240° F., flows to the suction side of intermediate pressure boiler feed water pump 282, which provides boiler feed water to the HRS boiler, and in parallel to high pressure boiler feed water pump 283, which provides boiler feed water to the high pressure waste heat boilers.

On the discharge side of intermediate pressure boiler feed water pump 282, the feed water stream may be divided, as necessary, to provide a dilution water stream 292 for the HRS diluter 260. The remainder of the discharge side flow of boiler feed water, at a pressure of typically 7 to 15 bar, passes through HRS heater 245 wherein it is heated by typically 120 to 150 Fahrenheit degrees, e.g., to a temperature in the range between about 345° to 375° F. From the HRS heater 245, the intermediate pressure boiler feed water flows to HRS boiler 244 where it is converted to steam, typically at 7 to 15 bar, but potentially as high as 25 bar or more, by transfer of heat from HRS acid exiting the heat recovery absorption zone 233.1 of absorber 233.

High pressure boiler feed water is discharged from feed water pump 283, typically at a temperature between about 240 and about 260° F. and a pressure between about 700 and about 800 psig, and passes through first heat exchanger 243 wherein it is further heated, typically by 40 to 60 Fahrenheit degrees, to a temperature typically in the range between about 470° to about 510° F. Boiler feed water exiting first heat exchanger 243 passes in series through economizer 229, where it is typically heated by 120 to 160 Fahrenheit degrees, e.g., to a temperature in the range of 380° to 420° F. by transfer of heat from conversion gas exiting third converter stage 217.3 of converter 217, and then through economizer 228, where it is typically heated by 110 to 140 Fahrenheit degrees, e.g., to a temperature in the range between about 490° and about 520° F., by transfer of heat from conversion gas exiting first converter stage 217.1 of converter 217.

From economizer 228, the boiler feed water flows into steam drum 218, which is common to first waste heat boiler 215 and second waste heat boiler 216.

Steam generated by transfer of heat from $SO_2$ combustion gas in first waste heat boiler 215 and from final stage conversion gas in second waste heat boiler 216 exits steam drum 218 and is passed in series through superheater 225, wherein it is typically heated by 170 to 200 Fahrenheit degrees e.g., to a temperature in the range between about 680° and about 700° F., by transfer of heat from gas flowing between first waste heat boiler 215 and first converter stage 217.1, and then through superheater 221, wherein it is further heated, typically by 90 to 110 Fahrenheit degrees, e.g., to a temperature in the range between 870° and about 900°, by transfer of heat from conversion gas exiting first converter stage 217.1 of converter 217.

High pressure blowdown tank 287 and low pressure blowdown tank 289 operate in the manner described above for blowdown tanks 87 and 89 of FIG. 2 and blowdown tanks 187 and 189 of FIG. 5.

Figure 8:
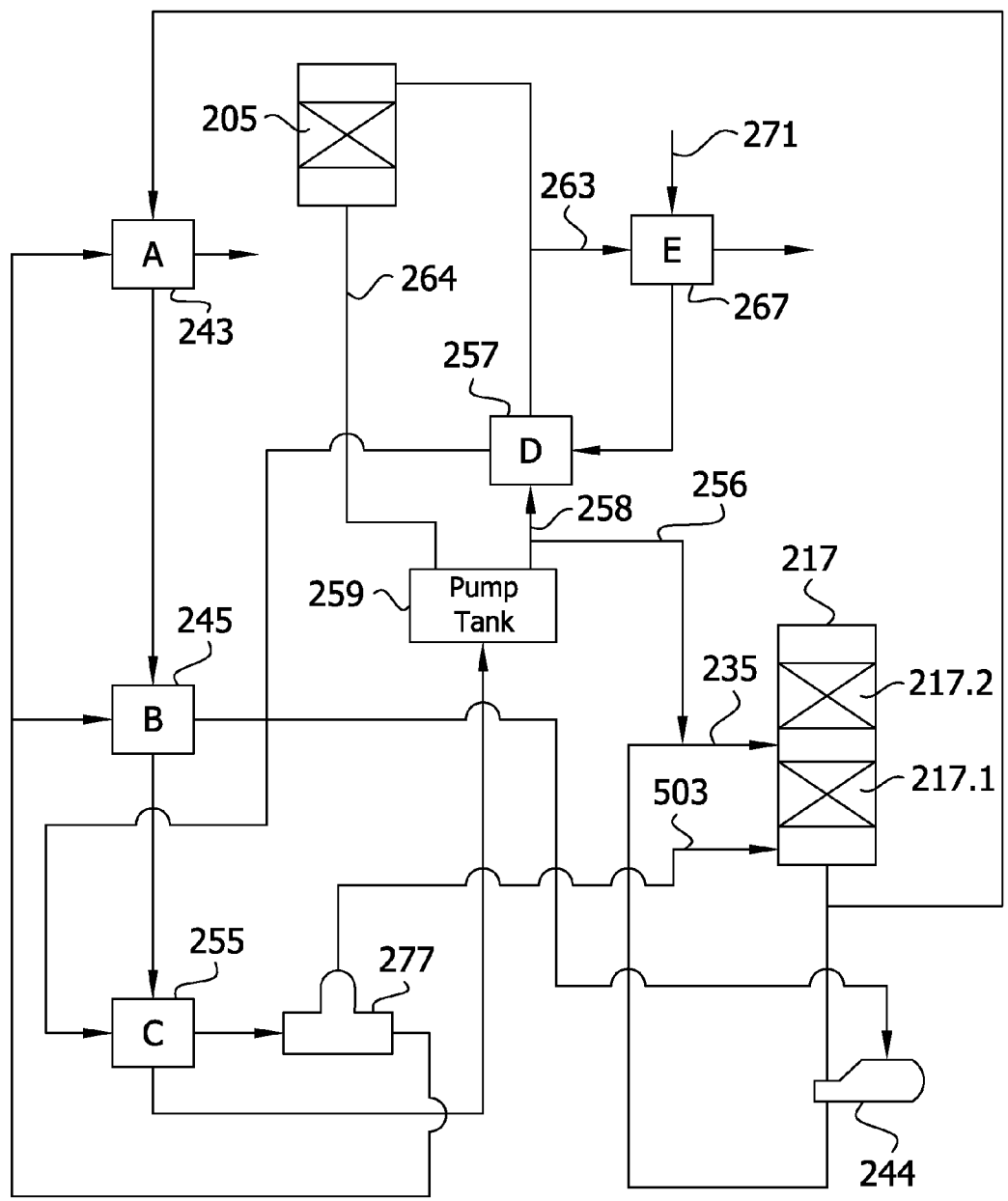
FIG. 8 is a schematic flow sheet integrating the flow sheets of FIGS. 6 and 7.

The alignment and relationship of the array of heat exchangers for transfer of energy from HRS acid to boiler feed water is illustrated in FIG. 8 which combines the flowsheets of FIGS. 6 and 7 with respect to the flow of boiler feed water and HRS acid. HRS acid 236 generated in heat recovery absorption zone 217.1 of absorber 217 flows in parallel to HRS boiler 244 and first heat exchanger 243 and in series between first heat exchanger 243, second heat exchanger 245 and third heat transfer system heat exchanger 255. Exiting heat exchanger 255, the HRS acid flows to common pump tank 259. Acid withdrawn from pump tank 259 is immediately divided to provide a stream directed to common acid cooler 257 and a recycle stream 256 that is combined with stream 248 in diluter 260 (FIG. 6; not shown in FIG. 8) to provide primary absorption acid stream 235. Stream 258 flows in series through common acid cooler 257 and thereafter in parallel between product acid cooler 267 and drying tower 205. A fraction of the acid is circulated between common acid cooler and the pump tank to maintain the pump tank acid concentration at a control value. Thus, heat exchangers 243, 245, 255, 257 and 267 are aligned in series with respect to HRS acid flow.

Boiler feed water 271 flows in series between product acid cooler 267, common acid cooler 257, third heat transfer system heat exchanger 255, and de-aerator 277, after which it is divided between an intermediate pressure boiler feed water stream that passes through second heat exchanger 245 and a high pressure boiler feed water stream that passes through first heat exchanger 243. Thus, heat exchangers 267, 257, and 255 are aligned in series with respect to boiler feed water flow and this combination of heat exchangers is aligned further in series with each of exchanger 245 and 243, though the latter two are in parallel with respect to each other on the boiler feed water side. HRS acid and boiler feed water flow countercurrently with respect to the array of heat exchangers comprising exchangers 243, 255, 257 and 267, and also flow countercurrently with respect to the overlapping array of heat exchangers 245, 255, 257 and 267.

Combined with this countercurrent arrangement of heat exchangers for progressively extracting HRS heat for progressively heating boiler feed water, the de-aerator 277 extracts energy that assures the maximum recovery of HRS vapor phase acid formation, absorption and condensation heat in the form of intermediate pressure and high pressure steam. Moreover, by controlling the allocation of HRS acid stream 236 between HRS boiler 244 and first heat exchanger 245, the process of FIGS. 6-8 may be operated to control the relative proportions of HRS energy recovered in the form of intermediate pressure vs. high pressure steam. As the proportion of HRS acid directed to heat exchanger 243 is increased relative to the proportion directed to HRS boiler 244, the proportion of absorption and condensation energy recovered in the form of high pressure steam is correspondingly increased, and the effect of operation of the process of FIGS. 6-8 approaches as a limit the effect achieved in the operation of the process as depicted in FIGS. 1-5.

In a contact sulfuric acid facility in which sulfur is burned in an oxygen-containing gas consisting essentially of air, the process of the invention is capable of generating substantially enhanced quantities of high pressure steam per unit manufacture of sulfuric acid. For example, where at least 60% of HRS heat is recovered in heating boiler feed water for the waste heat boiler(s) in which steam is generated by cooling the $SO_2$ combustion gas, at least about 1.45, more typically, at least about 1.55, and as much as 1.7, tons≥40 bar steam per ton of sulfuric acid is produced using only autogenous process heat for heating boiler feed water and generating high pressure steam. For purposes of this relationship and as otherwise used herein "autogenous process heat" comprises: (1) the heat of combustion of sulfur in oxygen-containing gas; (2) the heat of conversion of $SO_2$ to $SO_3$; (3) the heat of absorption of $SO_2$ in sulfuric acid; and (4) in those embodiments wherein water vapor is introduced into the conversion gas in or upstream of the heat recovery absorption zone: (a) the vapor phase heat of formation of sulfuric acid by reaction of water vapor with sulfur trioxide; (b) the heat of condensation of sulfuric acid in the heat recovery absorption zone; and (c) the heat of condensation of water vapor in the heat recovery absorption zone. Although the impact is relatively modest, autogenous process heat may also include (5) condensation of moisture from combustion air in a drying tower wherein the drying tower acid circuit is integrated into the absorption acid circuit as it is in the embodiments depicted in FIGS. 1 and 4. "HRS heat" comprises elements (3), (4) and (5) of autogenous process heat.

Where at least 60% of HRS heat is recovered in heating boiler feed water for the waste heat boiler(s), at least 1.45 tons of ≥40 bar steam is produced per ton of sulfuric acid from transfer of only the component of autogenous process heat consisting of the heat of combustion of sulfur plus HRS heat (i.e., all autogenous process heat except the heat of conversion of $SO_2$ to $SO_3$); and at least 1.45 tons of ≥40 bar steam is produced per ton of sulfuric acid product from transfer only of the component of autogenous process heat consisting of the heat of combustion of sulfur in air, the heat of absorption in the primary heat recovery absorption acid, vapor phase heat of formation of sulfuric acid, condensation of water in the heat recovery absorption zone, and condensation of sulfuric acid in the heat recovery absorption zone (i.e., sulfur combustion heat plus all HRS heat except drying tower heat).

Even without injection of water vapor into the conversion gas in or upstream of the heat recovery absorption zone, at least 1.45 tons of ≥40 bar steam is produced per ton of sulfuric acid product from transfer only of the component of autogenous process heat consisting of the heat of combustion of sulfur in air and the heat of absorption in the primary heat recovery absorption acid.

The embodiment of the process as described with reference to FIGS. 1 to 3 approaches the optimal generation of steam from the components of the autogenous process heat that exclude some or all of the heat of oxidation of $SO_2$ to $SO_3$, reserving all or part of that energy component for additional heating of boiler feed water in an economizer downstream of the aforesaid array of heat exchanger with respect to the flow of boiler feed water, and/or for imparting superheat to the high pressure steam. In the embodiment depicted in these drawings wherein a high percentage of the $SO_3$ reaction water is supplied in the form of water vapor, e.g., by introducing low pressure steam into steam injection vessel 31 of the process of FIG. 1, at least 1.4 tons, more typically at least about 1.5 tons, or as much as 1.6 tons of ≥40 bar steam can generated per ton of sulfuric acid product from the component of autogenous process heat resulting only from sulfur combustion in air, heat of absorption, vapor phase heat of formation of sulfuric acid, heat of sulfuric acid condensation, heat of water condensation, and condensation of moisture in a drying tower, with the $SO_2 \rightarrow SO_3$ heat of reaction being exclusively reserved for superheating the high pressure steam. Aside from the disposition of the heat of oxidation of $SO_2$ to $SO_3$, an increment of between about 0.2 and about 0.4 tons per ton of ≥40 bar steam is attributable in this case to the recovery of the heat of vapor phase sulfuric acid formation, $SO_3$ absorption and sulfuric acid condensation energy in the form of ≥40 bar steam.

The high pressure steam generation rates described herein are not only exclusive of any recovery of the heat of oxidation $SO_2$ to $SO_3$, but are also net of any heat imported from an extraneous source to generate low pressure steam for injection into the conversion gas upstream of the heat recovery absorption zone. Rather than relying on such extraneous source, the process of the invention preferably generates injection steam in a de-aerator for boiler feed water that has been initially heated by transfer of heat from absorption acid.

Preferably, at least 1.45 tons≥40 bar steam, or between about 1.55 and about 1.65 tons steam having a pressure between 40 and 70 bar, can be produced per ton of sulfuric acid from combustion, absorption, sulfuric acid condensation and water condensation in implementation of steam injection embodiments. In fact at least 1.4 of ≥50 bar steam, or between 1.4 and about 1.65 tons≥50 bar steam can be produced per ton sulfuric acid product in the process as illustrated in FIG. 1 to 3 or 4 and 5. Comparable productivity can be achieved in process of FIGS. 6-8 by minimizing the fraction of HRS acid that is passed through HRS boiler 244 and maximizing the fraction of HRS acid that comprises the forward acid flow fraction passing through heat exchangers 243, 244, 255, 257 and 267.

The process as described herein can be implemented in either a wet gas or dry gas sulfuric acid manufacturing facility. Operation in dry gas mode offers signal advantages and is preferred. The dry gas process is generally more robust and reliable than the wet gas process. In wet gas processes, there is always a risk that highly corrosive relatively dilute sulfuric acid can condense on metal surfaces along the gas flow train, due, e.g., to the presence of cold spots on duct walls, vessel walls or heat exchanger tubes, or resulting from an unplanned shutdown due to interruption in power supply, etc.

In dry gas operation, heat is recovered from multiple sources, thus minimizing consumption of line power or fossil fuels. The dried combustion air collects the heat of condensation of the water vapor from the ambient air, as well as the heat of compression that is generated when the dried air is raised to the pressure of the sulfur burner. From the heat recovery system absorption acid, the boiler feed water collects sensible heat derived from the vapor phase formation of sulfuric acid by reaction of $SO_3$ with injected water, the heat of condensation of sulfuric acid, and the heat of absorption of unreacted $SO_3$ in the conversion gas entering the heat recovery absorption zone. A portion of the heat of conversion of $SO_2$ to $SO_3$ is recovered in an economizer by further heating the boiler feed water that has exited the array of exchangers in which it has been heated by transfer of heat from heat recovery absorption acid. By transfer of heat from these various sources to high pressure boiler feed water, e.g., at 900 psig, the energy from all the sources is recovered in the form of high pressure steam. Heat of conversion of $SO_2$ to $SO_3$ is used to superheat the steam.

By carefully arraying a series of heat exchangers for progressive transfer of heat from heat recovery absorption acid to boiler feed water, a positive Δt is preserved throughout the series and the boiler feed water is brought close to its boiling point at a pressure equating to high pressure steam, e.g., 900 psig.

High pressure steam generated in the process can be used to drive a turbine for generation of electricity that can either be used within the facility where the sulfuric acid plant is located, or exported onto the commercial electrical grid.

Another major advantage of certain preferred embodiments the process is the use of only a single absorption system for absorption of $SO_3$ from the conversion gas. Thus, the gas exiting the heat recovery absorption system, which comprises the heat recovery absorption zone and optionally a secondary absorption zone as described above, is removed from the process without returning the gas to the converter for passage through another catalytic conversion zone, i.e., there is no interpass absorption step in this preferred embodiment of the novel processes described herein. This avoids the capital investment in an interpass absorption tower and makes certain that the maximum volume of high temperature enriched absorption acid is available for transfer of the heat of $SO_3$ absorption and sulfuric acid condensation to high pressure boiler feed water. This assures a generally favorable log mean Δt across the series of heat exchangers of the array of exchangers used for transfer of heat to high pressure boiler feed water.

Eliminating interpass absorption may marginally increase the sulfur dioxide content of the tail gas from the process. However, as described above, the $SO_2$ content of the tail gas can be removed and recovered by passing the gas through an $SO_2$ absorber and stripping $SO_2$ from the resulting absorption liquor, e.g., in accordance with the absorption and stripping processes variously described in copending and co-assigned applications Publication No. US 2012/0107209 A1, based on U.S. provisional application Ser. No. 61/408,420, filed Oct. 29, 2010, U.S. provisional application Ser. No. 61/641,833, filed May 2, 2012 and U.S. provisional application Ser. No. 61/793,571, filed Mar. 15, 2013, each of which are expressly incorporated herein by reference. Where a contact sulfuric acid process having only a single sulfur trioxide absorption system as described herein is coupled with a sulfur dioxide recovery process as described in either US provisional application Ser. Nos. 61/641,833 or 61/793,571, very high energy efficiency and low $SO_2$ emissions are both achieved. External energy demands can be substantially eliminated, and cooling water requirements are nearly so as well. The only material energy lost from the system to the surroundings is in the condenser for the overheads generated in stripping condensate that is condensed from the $SO_2$ stream recovered in the $SO_2$ absorption and stripping system that is integrated with the contact sulfuric acid process.

In further preferred embodiments of the present invention, the process as described generally above, and more particularly with reference to FIGS. 1 to 8, can be implemented in a process wherein the HRS absorption system is run under pressure, i.e., the heat recovery zone is contained within a heat recovery vessel, typically an absorption tower, that is operated under pressure. Preferably, pressure operation is conducted in a heat recovery vessel that further contains a secondary absorption zone wherein the gas stream exiting the primary absorption zone is contacted with a secondary absorption acid for cooling and recovery residual $SO_3$ from the exit gas stream. Preferably, the pressure within the heat recovery vessel ranges from 3 to 15 psig, more preferably from about 5 to about 15 psig, most typically from about 10 to about 15 psig. This substantially lowers the gas flow volume, allows accommodation of a moderately increased pressure gradient through the system, both of which work to reduce the requisite size of the expensive alloy absorption column containing the heat recovery and secondary absorption zones.

What is claimed is:

1. A process for the manufacture of sulfuric acid comprising:
    contacting a source gas comprising sulfur trioxide in a primary heat recovery absorption zone with a sulfur trioxide absorption acid stream comprising liquid sulfuric acid, thereby transferring sulfur trioxide from the source gas to the absorption acid stream and heating said absorption acid stream by heat of absorption;
    transferring heat from said absorption acid stream to a boiler feed water stream in an array of heat exchangers that are in series with respect to the flow of both the boiler feed water stream and the absorption acid stream, and with respect to which array said absorption acid stream and said boiler feed water stream flow countercurrently;
    allowing said boiler feed water stream to flash in a reduced pressure zone in the boiler feed water flow path between two successive heat exchangers in said series, thereby generating steam and cooling the boiler feed water stream in said reduced pressure zone;
    separating steam generated in said reduced pressure zone from said cooled boiler feed water stream;
    recovering in useful form the energy from steam generated in said reduced pressure zone;
    pressurizing said cooled boiler feed water stream;
    transferring said pressurized boiler feed water stream to another heat exchanger in said series that is downstream of said reduced pressure zone with respect to the flow of boiler feed water;
    heating said pressurized boiler feed water stream in said another heat exchanger by transfer of heat from said absorption acid;
    generating steam from the pressurized liquid water stream at a pressure of at least 40 bar in a boiler that is outside of said array and downstream of said another heat exchanger with respect to the flow of boiler feed water; and
    circulating said absorption acid stream from said series of heat exchangers back to said heat recovery absorption zone.

2. A process as set forth in claim 1 wherein at least 60% of the heat of absorption generated in said heat recovery absorption zone is transferred from said sulfur trioxide absorption liquid to said boiler feed water stream in said array of heat exchangers and recovered in the form of steam having a pressure of at least 40 bar that is generated in said boiler.

3. A process as set forth in claim 2 wherein at least 85% of the heat of absorption generated in said heat recovery absorption zone is transferred from said sulfur trioxide absorption acid to said boiler feed water in said array of heat exchangers and recovered in the form of steam generated in said reduced pressure zone plus steam having a pressure of at least 40 bar that is generated in said boiler.

4. A process as set forth in claim 2 wherein said source gas further comprises water vapor and/or sulfuric acid vapor and said absorption acid is further heated in said heat recovery zone by the heat of condensation of water vapor and/or sulfuric acid that is condensed from the gas phase to the liquid phase therein.

5. A process as set forth in claim 1 wherein at least 60% of the vapor phase heat of formation of sulfuric acid, heat of absorption and the heat of condensation generated in said heat recovery absorption zone is transferred from said sulfur trioxide absorption acid to said boiler feed water stream in said array of heat exchangers and recovered in the form of steam having a pressure of at least 40 bar that is generated in said boiler.

6. A process as set forth in claim 5 wherein at least 85% of the vapor phase heat of formation of sulfuric acid, the heat of absorption and the heat of condensation generated in said heat recovery absorption zone is transferred from said sulfur trioxide absorption acid to said boiler feed water in said array of heat exchangers and recovered in the form of steam generated in said reduced pressure zone plus steam having a pressure of at least 40 bar that is generated in said boiler.

7. A process as set forth in claim 1 wherein steam generated in said reduced pressure zone is recovered by deaeration of said boiler feed water.

8. A process as set forth in claim 7 wherein said reduced pressure zone comprises a de-aerator wherein the boiler feed water stream becomes de-aerated upon flashing of steam therefrom.

9. A process as set forth in claim 1 wherein steam flashed from said boiler feed water stream in said reduced pressure zone is injected into the sulfur trioxide source gas upstream of said heat recovery absorption zone.

10. A process as set forth in claim 1 wherein said flashing of boiler feed water in said reduced pressure zone is substantially adiabatic.

11. A process as set forth in claim 1 wherein said sulfur trioxide source gas comprises a conversion gas produced by a process that comprises contacting a feed gas comprising sulfur dioxide and oxygen in the presence of a catalyst, thereby oxidizing sulfur dioxide to sulfur trioxide.

12. A process as set forth in claim 11 wherein water vapor is introduced into the conversion gas upstream of said heat recovery absorption zone in a proportion sufficient to increase the equivalent water vapor content of the gas to at least about 0.60 moles per mole total equivalent sulfur trioxide gas content in the gas entering the heat recovery absorption zone.

13. A process as set forth in claim 12 wherein water vapor is introduced into the conversion gas in a proportion sufficient to increase the equivalent water vapor content of the gas entering the heat recovery absorption zone to at least about 0.80 moles, per mole total equivalent sulfur trioxide content of the gas entering the heat recovery absorption zone.

14. A process as set forth in claim 11 wherein prior to introduction of water vapor into said conversion gas, said conversion gas is cooled by transfer of heat to another fluid.

15. A process as set forth in claim 14 wherein cooling of said conversion gas comprises transfer of heat to boiler feed water in an economizer that is downstream of said array of heat exchangers with respect to the flow of boiler feed water.

16. A process as set forth in claim 14 wherein production of said conversion gas comprises catalytic oxidation of sulfur dioxide that has been produced by burning sulfur in a sulfur burner.

17. A process as set forth in claim 16 wherein cooling of said conversion gas comprises transfer of heat to combustion air for said sulfur burner.

18. A process as set forth in claim 16 wherein combustion air for said sulfur burner is heated by transfer of heat from said absorption acid.

19. A process as set forth in claim 1 wherein steam flashed from said boiler feed water stream in said reduced pressure zone is used for stripping sulfur dioxide from a sulfur dioxide absorption liquor produced by absorption of sulfur dioxide from a sulfur dioxide-contaminated gas stream into a liquid absorption medium comprising a sorbent for sulfur dioxide.

20. A process as set forth in claim 19 where said contaminated gas stream comprises tail gas from an absorber wherein sulfur trioxide is absorbed in sulfuric acid.

21. A process as set forth in claim 20 wherein said sulfur trioxide absorber comprises said heat recovery absorption zone.

22. A process as set forth in claim 1 wherein the gas stream exiting said heat recovery absorption zone is contacted with a secondary absorption liquid acid stream in a secondary absorption zone, residual $SO_3$ contained in the gas stream entering said secondary absorption zone being recovered as sulfuric acid in the secondary absorption acid.

23. A process as set forth in claim 1 wherein said series of heat exchangers with respect to which said sulfur trioxide absorption acid stream and said boiler feed water stream are countercurrently passed comprises a first heat exchanger in which said pressurized boiler feed water stream is heated to a temperature of at least about 400° F. and a second heat exchanger operating at lower boiler feed water pressure in which said boiler feed water stream is heated at a temperature above the ambient boiling point, said second heat exchanger being upstream and said first heat exchanger being downstream of said reduced pressure zone with respect to the flow of said boiler feed water stream, and said first heat exchanger being upstream of said second heat exchanger with respect to the flow of said absorption acid.

24. A process as set forth in claim 23 wherein said array of heat exchangers further comprises a product acid cooler through which a fraction of the acid exiting said second heat exchanger is passed, said fraction being cooled in said product acid cooler and thereafter removed from the process as product acid, said product acid cooler being upstream of said second heat exchanger with respect to the direction of boiler feed water flow and downstream of said second heat exchanger with respect to absorption acid flow.

25. A process as set forth in claim 23 wherein the absorption acid exiting said second heat exchanger is divided between a primary absorption acid that is recycled to said heat recovery absorption zone and a forward acid flow stream, said forward acid flow stream transferring heat to said boiler feed water stream in a third heat transfer system wherein the acid is further cooled and the boiler feed water stream exiting said product acid cooler is heated to a temperature above the ambient boiling point.

26. A process as set forth in claim 25 wherein said third heat transfer system comprises a plurality of heat exchangers in series with respect to which the boiler feed water stream and the forward acid flow stream are passed countercurrently.

27. A process as set forth in claim 25 wherein said boiler feed water stream flowing through said third heat transfer system is under pressure sufficient to maintain it substantially in the liquid state prior to entry into said reduced pressure zone.

28. A process as set forth in claim 25 wherein said boiler feed water flowing from said third heat transfer system to said second heat exchanger is passed through a heat exchanger outside of said array wherein the boiler feed water stream is heated by transfer of heat from a fluid other than said sulfur trioxide absorption acid.

29. A process as set forth in claim 28 wherein said other fluid comprises regenerated sulfur dioxide absorption medium produced by heating a sulfur dioxide absorption liquor for recovery of sulfur dioxide therefrom, said sulfur dioxide absorption liquor having been produced by a process comprising absorption of sulfur dioxide from a sulfur dioxide-contaminated gas stream into a liquid absorption medium comprising a sorbent for sulfur dioxide.

30. A process as set forth in claim 29 where said contaminated gas stream comprises tail gas from an absorber wherein sulfur trioxide is absorbed in sulfuric acid.

31. A process as set forth in claim 30 wherein said sulfur trioxide absorber comprises said primary heat recovery absorption zone.

32. A process as set forth in claim 22 wherein the gas stream exiting said heat recovery absorption zone is contacted with a secondary absorption acid in a secondary absorption zone, and said forward acid flow stream exiting said third heat transfer system is divided to provide said product acid stream and a secondary sulfur trioxide absorption acid stream that is recycled to said secondary absorption zone.

33. A process as set forth in claim 20 wherein preparation of said sulfur dioxide feed steam comprises combustion of a source of sulfur in a gas comprising air, and a portion of said secondary acid is circulated through a drying tower for the combustion air.

34. A process as set forth in claim 33 wherein heat is transferred from said secondary absorption acid to said boiler feed water stream in a fourth heat transfer system comprising a secondary absorption acid cooler, said secondary absorption acid cooler being downstream of said product acid cooler and upstream of said third heat transfer system with respect to the flow of boiler feed water, and downstream of said third heat transfer system and in parallel with said product acid cooler with respect to flow of said secondary acid.

35. A process as set forth in claim 34 wherein acid exiting said third heat transfer system is directed to a common reservoir from which said product acid, said secondary absorption acid and acid for said drying tower are withdrawn, and to which acid from the drying tower is returned.

36. A process as set forth in claim 1 wherein said boiler is a waste heat boiler in which said boiler feed water stream is converted to steam having a pressure greater than 40 bar by transfer of heat from a combustion gas produced by combustion of a sulfur source in a gas comprising oxygen.

37. A process as set forth in claim 36 wherein said combustion gas comprises oxygen and, after exiting said waste heat boiler, is contacted with a catalyst for conversion of sulfur dioxide to sulfur trioxide, thereby producing a conversion gas comprising sulfur trioxide that is contacted with said sulfur trioxide absorption acid in said primary heat recovery zone.

38. A process as set forth in claim 37 wherein said conversion gas comprising sulfur trioxide is produced in a catalytic converter comprising a plurality of catalytic conversion zones, conversion gas from said converter and containing at least about 3 volume percent sulfur trioxide is directed to said heat recovery absorption zone, and the gas exiting said heat recovery absorption zone is not directed to any further catalytic conversion zone for further conversion to sulfur trioxide of residual sulfur dioxide in said exit gas.

39. A process as set forth in claim 37 wherein said conversion gas comprising sulfur trioxide is produced in a catalytic converter comprising a plurality of catalytic conversion zones, conversion gas from said converter is delivered substantially exclusively to said heat recovery absorption zone, and the gas exiting said heat recovery absorption zone is not directed to any further catalytic conversion zone for further conversion to sulfur trioxide of residual sulfur dioxide in said exit gas.

40. A process as set forth in claim 37 wherein said conversion gas comprising sulfur trioxide is produced in a catalytic converter comprising a plurality of catalytic conversion zones in series, conversion gas from only the final catalytic conversion zone is contacted with sulfuric acid for absorption of sulfur trioxide therefrom, and the gas exiting said heat recovery absorption zone is not directed to any further catalytic conversion zone for further conversion to sulfur trioxide of residual sulfur dioxide in said exit gas.

41. A process as set forth in claim 37 wherein a tail gas comprising sulfur dioxide contained in the gas stream exiting said heat recovery absorption zone is contacted in a sulfur dioxide absorber with a sulfur dioxide absorption medium comprising a sorbent for sulfur dioxide, thereby producing a sulfur dioxide absorption liquor, and said sulfur dioxide absorption liquor is heated for recovery of sulfur dioxide therefrom.

42. A process as set forth in claim 41 wherein heating of said sulfur dioxide absorption liquor to recover sulfur dioxide produces a regenerated sulfur dioxide absorption medium that is recycled to said sulfur dioxide absorber for absorption of sulfur dioxide from a further flow of said tail gas.

43. A process as set forth in claim 41 wherein boiler feed water flowing through said array of heat exchangers is passed through a sixth heat exchanger outside of said array wherein the boiler feed water stream is heated by transfer of heat from said regenerated sulfur dioxide absorption medium or by transfer of heat from a gas stream comprising sulfur dioxide stripped from said absorption liquor and water vapor that is condensed in said sixth heat exchanger.

44. A process as set forth in claim 43 wherein said fifth heat exchanger is between said second heat exchanger and said third heat transfer system with respect to the flow of said boiler feed water stream.

45. A process as set forth in claim 36 wherein sulfur is burned in an oxygen-containing gas consisting essentially of air, said process being capable of producing at least 1.45 tons of ≥40 bar steam per ton of sulfuric acid from transfer only of autogenous process heat.

46. A process as set forth in claim 45 capable of producing at least 1.45 tons of ≥40 bar steam per ton of sulfuric acid from transfer only of the component of autogenous process heat consisting of the heat of combustion from burning sulfur in an oxygen-containing gas, the vapor phase heat of formation of sulfuric acid, the absorption of sulfur trioxide into said primary heat recovery absorption acid, condensation of water in said heat recovery absorption zone, condensation of sulfuric acid in said heat recovery absorption zone, and condensation of moisture from the air into sulfuric acid in a drying tower.

47. A process as set forth in claim 45 capable of producing at least 1.45 tons of steam per ton of sulfuric acid from transfer only of the component of autogenous process heat consisting of the heat of combustion from burning sulfur in an oxygen-containing gas, the vapor phase heat of formation of sulfuric acid, the absorption of sulfur trioxide into said primary heat recovery absorption acid, condensation of water in said heat recovery absorption zone, and condensation of sulfuric acid in said heat recovery absorption zone.

48. A process as set forth in claim 45 capable of producing at least 1.45 tons of steam per ton of sulfuric acid from transfer only of the component of autogenous process heat consisting of the heat of combustion from burning sulfur in an oxygen-containing gas and absorption of sulfur trioxide into said primary heat recovery absorption acid.

49. A process as set forth in claim 45 wherein the transfer to waste heat boiler feed water of the vapor phase heat of formation of sulfuric acid, the heat of absorption of sulfur trioxide in said absorption acid in said heat recovery absorption zone, condensation of water in said heat recovery absorption zone, and condensation of sulfuric acid in said heat recovery absorption zone results in the production of an added increment of at least about 0.2 tons≥40 bar steam from said waste heat boiler per ton of sulfuric acid produced.

50. A process as set forth in claim 45 wherein the transfer to waste heat boiler feed water of the heat of absorption of sulfur trioxide in said absorption acid in said heat recovery absorption zone results in the production of an added increment of 0.2 tons≥40 bar steam from said waste heat boiler per ton of sulfuric acid produced.

51. A process as set forth in claim 45 wherein said heat recovery absorption zone is contained within a heat recovery vessel that is operated at a gas pressure between about 3 and about 15 psig.

52. A process as set forth in claim 51 wherein said heat recovery vessel further contains a secondary absorption zone wherein the gas stream exiting the heat recovery absorption zone is contacted with a secondary absorption acid for cooling and recovering residual $SO_3$ from said exit gas stream.

53. A process as set forth in claim 45 wherein air for combustion of sulfur is heated by transfer of heat from said absorption acid.

54. A process as set forth in claim 53 wherein heat is transferred to said combustion air from both said conversion gas and said absorption acid.

55. A process for the manufacture of sulfuric acid comprising:
    contacting a source gas comprising sulfur trioxide in a primary heat recovery absorption zone with a sulfur trioxide absorption acid stream comprising liquid sulfuric acid, thereby transferring sulfur trioxide from the source gas to the absorption acid stream and heating said absorption acid stream by heat of absorption;
    transferring heat from said absorption acid stream to a boiler feed water stream, thereby heating the boiler feed water stream to a temperature of at least 375° F.; and
    thereafter transporting the heated boiler feed water to a boiler wherein steam is generated from the heated boiler feed water stream at a pressure of at least 40 bar;
    wherein at least about 75% of the heat of absorption generated in said heat recovery absorption zone is recovered in the form of steam having a pressure of at least 40 bar that is generated in said boiler.

56. A process as set forth in claim 55 wherein
    at least about 75% of the heat of absorption generated in said heat recovery absorption zone is transferred to a boiler feed water stream in an absorption acid cooler; and
    the boiler feed water is pressurized to at least 40 bar prior to entry into the absorption acid cooler.

57. A process as set forth in claim 55 wherein
    the boiler feed water stream is heated to a temperature of at least 400° F. by transfer of heat from said absorption acid in an absorption acid cooler.

58. A process as set forth in claim 55 wherein the gas exiting said heat recovery absorption zone is contacted with liquid sulfuric acid in a secondary absorption zone for absorption of residual sulfur trioxide from the gas phase.

59. A process as set forth in claim 55 wherein transfer of heat from said absorption acid stream increases the temperature of the boiler feed water by between 150 and 220 Fahrenheit degrees.

60. A process as set forth in claim 55 wherein source gas further comprises water vapor and sulfuric acid vapor.

61. A process as set forth in claim 55 wherein water vapor is introduced into said source gas in a proportion sufficient to increase the equivalent water vapor content of the gas to at least 0.60 moles per mole total equivalent sulfur trioxide gas prior to contacting the source gas with said absorption acid stream.

62. A process as set forth in claim 61 wherein the gas exiting said heat recovery absorption zone is contacted with liquid sulfuric acid in a secondary absorption zone for absorption of residual sulfur trioxide from the gas phase, the process being conducted in a single absorption system wherein no gas stream exiting a sulfur trioxide absorption zone is returned to any catalytic conversion zone.

63. A process for the manufacture of sulfuric acid comprising:
- burning a source of sulfur in a gas containing excess oxygen to produce a combustion gas comprising sulfur dioxide and oxygen;
- passing said combustion gas through a waste heat boiler wherein the heat of combustion is recovered by transfer of heat to a boiler feed water stream for generation of steam at a pressure greater than 40 bar;
- contacting said combustion gas with a catalyst in a series of catalytic conversion zones for conversion of sulfur dioxide to sulfur trioxide, thereby producing a conversion gas comprising sulfur trioxide;
- contacting said conversion gas with a sulfur trioxide absorption acid stream comprising liquid sulfuric acid in a heat recovery absorption zone, thereby transferring sulfur trioxide from the source gas to the absorption acid stream and heating said absorption acid stream by heat of absorption;
- transferring heat from said absorption acid stream to a boiler feed water stream; and
- thereafter transferring said boiler feed water stream to said waste heat boiler for generation of steam from the heated boiler feed water stream at a pressure of at least 40 bar, wherein at least about 75% of the heat of absorption generated in said heat recovery absorption zone is recovered in the form of steam having a pressure of at least 40 bar that is generated in said boiler; and
- discharging residual sulfur dioxide contained in the gas stream exiting said heat recovery absorption zone from the process without further contact with catalyst for the conversion of sulfur dioxide to sulfur trioxide,
- said process being conducted in a single absorption system wherein no gas stream exiting a sulfur trioxide absorption zone is returned to any catalytic conversion zone.

64. A process as set forth in claim 63 wherein said single absorption system comprises a primary absorption zone wherein said conversion gas is contacted with a liquid sulfuric acid stream and a secondary absorption zone wherein gas exiting the primary absorption zone is contacted with liquid sulfuric acid, the gas exiting said secondary absorption zone being discharged from the process without further contact with catalyst for the conversion of sulfur dioxide to sulfur trioxide.

65. A process as set forth in claim 64 wherein water vapor is introduced into the conversion gas prior to contact of the conversion gas with the absorption acid stream in the heat recovery absorption zone.

* * * * *